(12) United States Patent
Eisenberg et al.

(10) Patent No.: US 6,507,441 B1
(45) Date of Patent: Jan. 14, 2003

(54) DIRECTED REFLECTORS AND SYSTEMS UTILIZING SAME

(75) Inventors: Naftali P. Eisenberg, Jerusalem (IL); Isaia Glaser-Inbari, Givatayim (IL); Avishai Drori, Jerusalem (IL); Reouven Karoubi, Bat Yam (IL); Yoel Arieli, Jerusalem (IL)

(73) Assignee: Optid, Optical Identification Technologies Ltd., Jerusalem (IL)

( * ) Notice: Subject to any disclaimer, the term of this patent is extended or adjusted under 35 U.S.C. 154(b) by 18 days.

(21) Appl. No.: 09/688,120

(22) Filed: Oct. 16, 2000

(51) Int. Cl.[7] .............................................. G02B 27/10
(52) U.S. Cl. ........................ 359/627; 359/619; 359/626
(58) Field of Search ................................. 359/619, 625, 359/626, 627

(56) References Cited

U.S. PATENT DOCUMENTS

| | | | |
|---|---|---|---|
| 3,571,571 A | 3/1971 | Kapsambelis | 235/454 |
| 3,612,644 A | 10/1971 | Stites | 359/217 |
| 3,657,981 A | * 4/1972 | Benton | 396/330 |
| 3,700,305 A | 10/1972 | Bingham | 359/540 |
| 3,801,183 A | 4/1974 | Sevelin et al. | 359/537 |
| 4,099,838 A | 7/1978 | Cook et al. | 359/537 |
| 4,278,351 A | 7/1981 | Frosch | 356/455 |
| 4,307,939 A | 12/1981 | Berg | 359/529 |
| 4,447,723 A | 5/1984 | Neumann | 250/236 |
| 4,676,613 A | * 6/1987 | Collender | 352/58 |
| 4,777,660 A | 10/1988 | Gould et al. | 359/169 |
| 4,789,219 A | 12/1988 | Layne | 359/515 |
| 4,895,428 A | 1/1990 | Nelson et al. | 359/530 |
| 4,957,335 A | 9/1990 | Kuney, Jr. | 359/541 |
| 5,080,463 A | 1/1992 | Faykish et al. | 359/536 |
| 5,083,866 A | 1/1992 | Dey | 356/508 |
| 5,118,930 A | 6/1992 | Takada | 235/488 |
| 5,169,707 A | 12/1992 | Faykish et al. | 428/195 |
| 5,237,164 A | 8/1993 | Takada | 235/487 |
| 5,357,371 A | 10/1994 | Minott | 359/534 |
| 6,015,214 A | 1/2000 | Heenan et al. | 359/529 |

FOREIGN PATENT DOCUMENTS

| | | |
|---|---|---|
| EP | 768614 A2 | 4/1997 |
| EP | 844056 A1 | 5/1998 |

* cited by examiner

Primary Examiner—Ricky Mack
(74) Attorney, Agent, or Firm—G.E. Ehrlich Ltd.

(57) ABSTRACT

A wide angle directed reflector is disclosed. The directed reflector includes a lenticular layer including at least one array of lenslets, each of which having a focal length, The directed reflector further includes a reflective layer which is disposed relative to the lenticular layer. The lenticular layer and the reflective layer are constructed, designed and relatively disposed such that light incident at an angle of incidence on the lenticular layer is reflected by the reflective layer and redirected through the lenticular layer at a substantially constant angle relative to the angle of incidence.

59 Claims, 16 Drawing Sheets

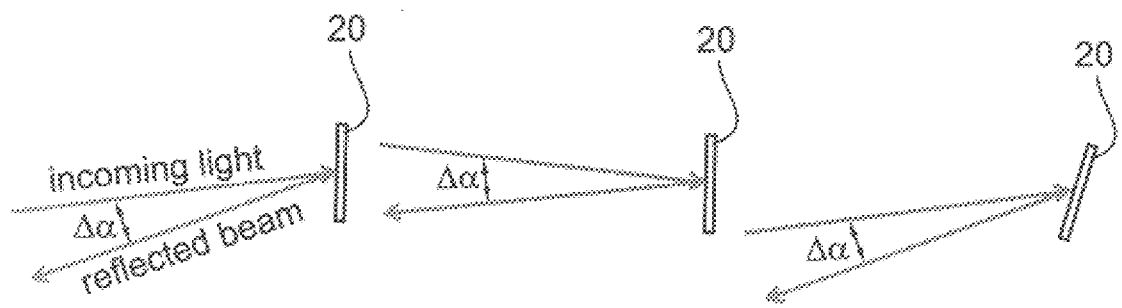
Fig. 1a
Priort Art
Fig. 1b
Priort Art
Fig. 1c
Priort Art
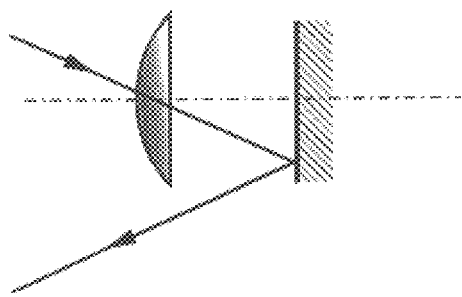
Fig. 2a
Priort Art
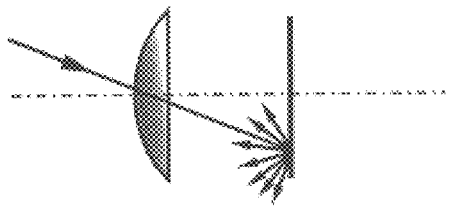
Fig. 2b
Priort Art
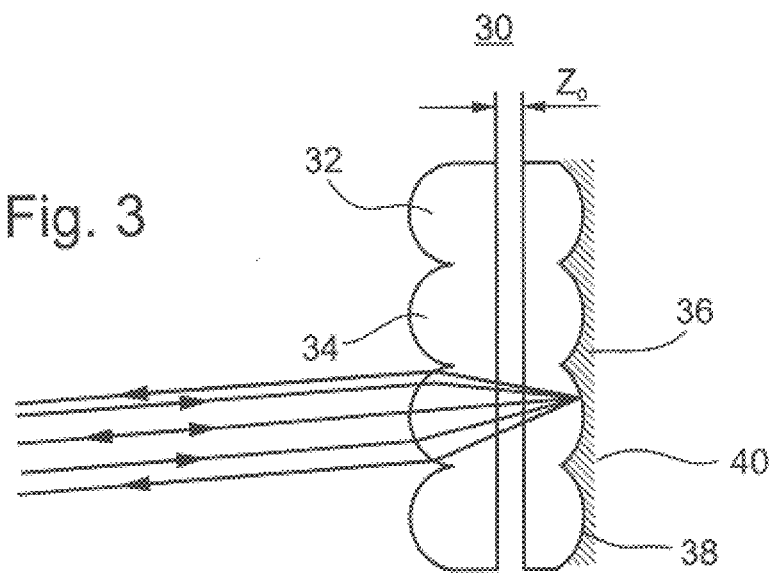
Fig. 3

1/4 wave plate

1/4 wave plate

1/2 wave plate at 45° polarizer mirror

1/4 wave plate    mirror legend unpolarized | left  right circular polarization | vertical  horizontal linear polarization

DIRECTED REFLECTORS AND SYSTEMS UTILIZING SAME

FIELD AND BACKGROUND OF THE INVENTION

The present invention relates to a directed reflector, such as a retroreflector and more particularly to, directed reflectors which utilize an array of lenslets in combination with a reflector such that incident (incoming) light of a wide range of acceptance angles is reflected therefrom at a generally constant return angle relative to the angle of incidence.

Directed reflectors are optical devices that reflect incident light in a direction which has an essentially fixed angle relative to that of an incident light beam, with little or no dependence on the angle between the light beam and the reflector surface. FIGS. 1a–c, show a directed reflection effect of a directed reflector 20. It is evident that, regardless of the angle of incidence of the incoming-light, the light is reflected at a constant angle with respect to the angle of incidence ($\Delta\alpha$).

Retroreflectors are directed reflectors which redirect light towards its originating source (i.e., $\Delta\alpha=0$). A review of various types of retroreflectors and their uses appears in reference [35] which is incorporated herein by reference. This advantageous property of retroreflectors has led to the widespread implementation thereof in planar array configurations which can be utilized in a variety of applications. For example, arrays of miniature retroreflector are often utilized in sheeting which are used for road signs in order to increase their visibility to motorists at night and for retroreflective safety devices used in vehicles and by other road users. Retroreflector arrays are also used with light barriers and with a beam scanning apparatus, such as the beam scanning apparatus used for generating light grids and light curtains.

One type of a retroreflectors array is constructed from a monolayer of microspheres embedded in a cover layer. Behind the rear surfaces of the microspheres, separated by a spacing layer, a reflective layer, e.g., vapor-coated aluminum, is disposed such that light penetrating through, and directed by, the microspheres is reflected out by the reflective layer. Such embedded microspheres array is also referred to in the art as embedded lens array, whereas each microsphere or lens in combination with its reflective surface is sometimes referred to as a cat eye retroreflector element. Nevertheless such microspheres typically have very poor lenticular quality, and as such lack a well defined focal length which is required by various reflector applications. Furthermore, such microspheres are characterized by high level of optical aberrations which result in loss of the ability to focus incident light, particularly when incident at a wide range of acceptance angles, on the reflective layer. Arrays of microsphere based retroreflectors have been observed in nature [16] and have found applications in-man made devices [1]. Such retroreflectors are thoroughly analyzed in the scientific and technical literature [see, for example, references 4, 11, 15, 18, 19, 22 and 51]. There are also several descriptions of fabrication methods for producing sheets containing many miniature cat-eye retroreflectors [9, 10, 17, 40, 42, 49, 50].

As described above, a prior art embedded lens array type retroreflector is typically a combination of crude lenses and a reflector surface (a mirror or a diffuse reflecting surface) that is located at the back focal plane of each lens. Any collimated beam of light that enters this structure is reflected back at the source (retroreflected), provided the reflection from the reflector re-enters the aperture of the same lens. However, embedded lens array retroreflectors utilizing flat, specular (optically smooth) reflectors suffer from a limited range of incidence angles acceptable for retroreflection (also referred to in the art as acceptance angles). This characteristic is demonstrated by FIGS. 2a–b which depict cross sectional views of such retroreflecting arrays. As shown in FIG. 2a, light entering prior art embedded lens array retroreflectors utilizing specular (smooth) reflecting surface, at an angle greater than the acceptance angle, is no longer returned to the same lenslet and as such is not retroreflected. In addition, when the reflecting surface is diffuse (optically rough or otherwise scattering) as specifically shown in FIG. 2b, this diffusely reflective surface of such prior art lens arrays also leads to scattering of the reflected light over several lenses, resulting in loss of retroreflected light and low retroreflection coefficient.

Although this limited angular response range and low retroreflection coefficient of prior art retroreflectors is acceptable for some applications, there are, however, applications for which these effects are non-tolerable. In particular, applications which require accurate reflection of incident light, such as incorporation of retroreflectors in beam scanning applications, are extremely difficult to effect with arrays utilizing embedded microspheres; for these applications it is particularly important that the retroreflector and the light transmitter/receiver of the beam scanning apparatus are accurately aligned.

Since embedded lens arrays retroreflectors are not applicable in various applications such as, for example, beam scanning, interest has been centered, in the past, on cube-corner retroreflectors, which are products of high optical quality and as such can provide more accurate reflected beam of light. Cube-corner retroreflectors are trihedral structures which have three mutually perpendicular lateral faces meeting at a single corner, such as that configuration defined by the corner of a cube. The retroreflectivity typically achieved by cube-corner type reflecting elements is through triple reflection (often utilizing the principle of total internal reflection). A transparent cube-corner element receives a ray of incident light at an angle and sends it back in the same direction. To this end, see, for example, U.S. Pat. Nos. 3,924,929, 4,672,089, 4,349,598, and 4,588,258, EP 0 844 056 A1, which are incorporated herein by reference.

In order to overcome the relatively pronounced directional dependence which is associated with reflection at retroreflectors, attempts have been made to sub-divide a retroreflector consisting of triple reflectors into individual elements (see, for example, DE-PS No. 22 36 482, which is incorporated herein by reference). In this arrangement the individual retroreflecting elements are inclined to one another at increasing angles such that the scanning light beam of a light curtain impinges as closely as possible to normal incidence on the individual triple elements which are directionally dependent. An array configuration with retroreflecting elements inclined at increasing angles to one another is, however, only suitable for use with a sector-shaped scanning beam. Each individual retroreflector element must also be set at a predetermined position relative to the scanning beam and this makes it difficult, if not practically impossible, to manufacture such a retroreflector using cost-effective mass production techniques.

In addition, due to the functional design of cube-corner retroreflectors, fabrication or utilization thereof in sheeting results in the addition of undesirable thickness which limits their applicability.

While retroreflectors can and are manufactured by classical optical procedures (polishing, etc.), such devices are too expensive for most applications. Most retroreflecting surfaces in use today are stamped, molded, or otherwise replicated, arrays of corner-cube elements or cat-eye elements, or a suspension of very small glass or transparent plastic beads (microspheres) in paint, where the beads act as crude lenses and the paint as a reflector. Retroreflectors manufactured by classical methods are high precision instruments of very high performance, but they are too expensive and often too bulky for most applications. The standard molded/stamped retroreflectors of today and, more so, the bead suspension type of retroreflectors are inexpensive, but for many important applications their performance is, at best, marginal.

There is thus a widely recognized need for, and it would be highly advantageous to have, a directed reflector, retroreflector in particular, devoid of the above limitations.

SUMMARY OF THE INVENTION

According to one aspect of the present invention there is provided a wide angle directed reflector. The directed reflector according to this aspect of the invention includes a lenticular layer including at least one array of lenslets, each of which having a focal length. The directed reflector according to this aspect of the present invention further includes a reflective layer, which is disposed relative to the lenticular layer. The lenticular layer and the reflective layer are constructed, designed and relatively disposed such that light incident at an angle of incidence on the lenticular layer is reflected by the reflective layer and redirected through the lenticular layer at a substantially constant angle relative to the angle of incidence.

According to another aspect of the present invention there is provided a wide angle controllable directed reflector. The directed reflector according to this aspect of the invention includes a lenticular layer including at least one array of lenslets, each of which having a focal length. The directed reflector according to this aspect of the present invention further includes a reflective layer disposable relative to the lenticular layer. The lenticular layer and the reflective layer are constructed, designed and relatively disposed such that, for a given relative orientation thereof, light incident at an angle of incidence on the lenticular layer is reflected by the reflective layer and redirected is through the lenticular layer at a substantially constant angle relative to the angle of incidence The directed reflector according to this aspect of the present invention further includes a directed reflection controlling mechanism which is designed and constructed to controllably alter the given relative orientation of, or the distance between, the lenticular layer and the reflective layer, such that light incident at the angle of incidence on the lenticular layer is reflected by the reflective layer and redirected through the lenticular layer at an angle different than the substantially constant angle relative to the angle of incidence.

According to further features in preferred embodiments of the invention described below, the directed reflection controlling mechanism is designed and constructed so as to reciprocally alter the given relative orientation of, or the distance between, the lenticular layer and the reflective layer.

According to yet another aspect of the present invention there is provided a light modulating directed reflector. The directed reflector according to this aspect of the present invention includes a lenticular layer including at least one array of lenslets, each of which having a focal length. The directed reflector according to this aspect of the present invention further includes a reflective layer disposed relative to the lenticular layer. The lenticular layer and the reflective layer are constructed, designed and relatively disposed such that light incident at an angle of incidence on the lenticular layer is reflected by the reflective layer and redirected through the lenticular layer at a substantially constant angle relative to the angle of incidence. The directed reflector according to this aspect of the present invention further includes a light modulating layer disposed relative to the lenticular layer and the reflective layer and which serves for modulating light passing through and reflected from the light modulating wide angle directed reflector.

According to still another aspect of the present invention there is provided a light modulating wide angle directed reflector. The directed reflector according to this aspect of the present invention includes a lenticular layer including at least one array of lenslets. The directed reflector according to this aspect of the present invention further includes a reflective layer disposed relative to the lenticular layer. The lenticular layer and the reflective layer are constructed, designed and relatively disposed such that light incident at an angle of incidence on the lenticular layer is reflected by the reflective layer and redirected through the lenticular layer at a substantially constant angle relative to the angle of incidence. The directed reflector according to this aspect of the present invention further includes a light modulating layer disposed relative to the lenticular layer and the reflective layer. The light modulating layer serves for modulating light passing through and reflected from the light modulating wide angle directed reflector. The light modulating according to this aspect of the present invention is transformable from a first light modulating state to a second light modulating state and vice versa.

According to an additional aspect of the present invention there is provided an object identification system. The system according to this aspect of the present invention includes an identifier tag which is mountable on an object to be identified. The identifier tag includes the features described herein for the light modulating directed reflector. The system according to this aspect of the present invention includes an interrogator device. The latter includes (i) a light source for directing light onto the identifier tag; (ii) a light detector for receiving modulated light reflected from the identifier tag; and (iii) a processing unit communicating with the light detector for processing the light reflected so as to yield information corresponding to the light modulating layer, to thereby identify the object.

According to yet an additional aspect of the present invention there is provided a movement monitoring system for monitoring a movement of an object. The system according to this aspect of the present invention includes at least one wide angle directed reflector being mountable on the object, the at least one wide angle directed reflector includes all the features described hereinabove with respect thereto. The system according to this aspect of the present invention further includes an optical sensing device. The latter includes (i) a light source for illuminating the at least one wide angle directed is reflector; and (ii) a detector for receiving light reflected from the at least one directed reflector. The detector serves for monitoring changes in the reflected light, so as to monitor a movement and/or position of the object. The at least one wide angle directed reflector preferably further includes a light modulating layer disposed relative to the lenticular layer and the reflective layer. The light modulating layer being for modulating light passing through and reflected from the light modulating wide angle directed reflector. Preferably, a plurality of wide angle directed reflectors, typically retroreflectors, spaced along the object, such as a wing of an aircraft, are employed, thereby monitoring vibrational movement along the object.

According to further features in preferred embodiments of the invention described below, the reflector is a rear telecentric reflector.

According to still further features in the described preferred embodiments the angle of acceptance of the wide angle retroreflector is at least +/− 20° degrees from a normal incidence angle. According to still further features in the described preferred embodiments the substantially constant angle is substantially zero and therefore the directed reflector is a retroreflector.

According to still further features in the described preferred embodiments the substantially constant angle is substantially different than zero and therefore the directed reflector is not a retroreflector.

According to still further features in the described preferred embodiments the reflective layer includes an array of concave reflective elements.

According to still further features in the described preferred embodiments each of the lenslets of the lenticular layer includes a convex face and an opposing flat face.

According to still further features in the described preferred embodiments each of the lenslets of the lenticular layer is selected from the group consisting of a diffractive lenslet, a refractive lenslet, and a combination diffractive-refractive lenslet.

According to still further features in the described preferred embodiments lenslets of the at least one array of lenslets and the concave reflective elements of the array of concave reflective elements are optically co-aligned.

According to still further features in the described preferred embodiments a distance between a lenslet of the lenslets and a respective concave reflective element of the concave reflective elements is selected such that a center of the concave reflective element is located at a focal plane of the lenslet.

According to still further features in the described preferred embodiments the lenticular layer and the reflective layer are integrated into a single layer.

According to still further features in the described preferred embodiments the lenticular layer includes an external array of lenslets and an internal array of lenslets.

According to still further features in the described preferred embodiments each lenslet of each of the external array of lenslets and the internal array of lenslets includes a convex face and a planar opposing face.

According to still further features in the described preferred embodiments respective lenslets of the external array of lenslets and the internal array of lenslets form lenslet pairs such that the planar opposing faces thereof face one another.

According to still further features in the described preferred embodiments the reflective layer is planar.

According to still further features in the described preferred embodiments for each of the lenslet pairs, incident light passing through an aperture of a lenslet of the external array of lenslets and then through a respective internal lenslet of the internal array of lenslets is rendered normal to the reflective layer.

According to still further features in the described preferred embodiments each lenslet of the array of lenslets includes a pair of opposing convex faces.

According to still further features in the described preferred embodiments the reflective layer is a corrugated planar reflector.

According to still further features in the described preferred embodiments the reflective layer includes an array of concave corrugated reflective elements.

According to still further features in the described preferred embodiments each of the lenslets has a diameter less than about 1 mm.

According to still further features in the described preferred embodiments each of the lenslets has a diameter less than about 0.5 mm.

According to still further features in the described preferred embodiments each of the lenslets has a diameter less than about 0.1 mm.

According to still further features in the described preferred embodiments the light modulating layer and the reflective layer are integrated into a single reflective and light modulating layer.

According to still further features in the described preferred embodiments the light modulating layer is selected from the group consisting of a light polarizing layer, a polarization fractional-wave retardation plate, an optical filter, and a patterned layer having substantially opaque regions and substantially transparent regions.

According to still further features in the described preferred embodiments the modulating layer is disposed between said lenticular layer and said reflective layer.

According to still further features in the described preferred embodiments the modulating layer forms a part of said reflective layer.

According to still further features in the described preferred embodiments the light modulating layer is disposed between the lenticular layer and the reflective layer.

According to still further features in the described preferred embodiments the light modulating layer is disposed in front of the lenticular layer.

According to still further features in the described preferred embodiments the light modulating layer includes a fluid.

According to still further features in the described preferred embodiments the patterned layer is a code identifying an object with which the light modulating wide angle directed reflector is associatable.

According to still further features in the described preferred embodiments the code is a bar-code.

According to still further features in the described preferred embodiments the light modulating layer is transformable from a first light modulating state to a second light modulating state and vice versa.

According to still further features in the described preferred embodiments the second light modulating state is neutral.

The present invention successfully addresses the shortcomings of the presently known configurations by providing directed reflectors and retroreflectors which are readily manufacturable and which are characterized by a wide angle of acceptance and high reflection coefficient as is compared to prior art designs.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1a–c show the functionality of a directed reflector. Note that despite the relative changes in position of the reflector and the incoming beam, the angle between the incoming and reflected beams, $\Delta\alpha$, does not change significantly.

FIGS. 2a–b are cross-sectional views of a prior art microlens based retroreflector illustrating the limitations inherent to prior art retroreflectors with conventional flat reflective surfaces;

FIG. 3 is a cross sectional view of a wide angle retroreflector according to one aspect of the present invention;

DESCRIPTION OF THE PREFERRED EMBODIMENTS

Figures 4A, 4B:
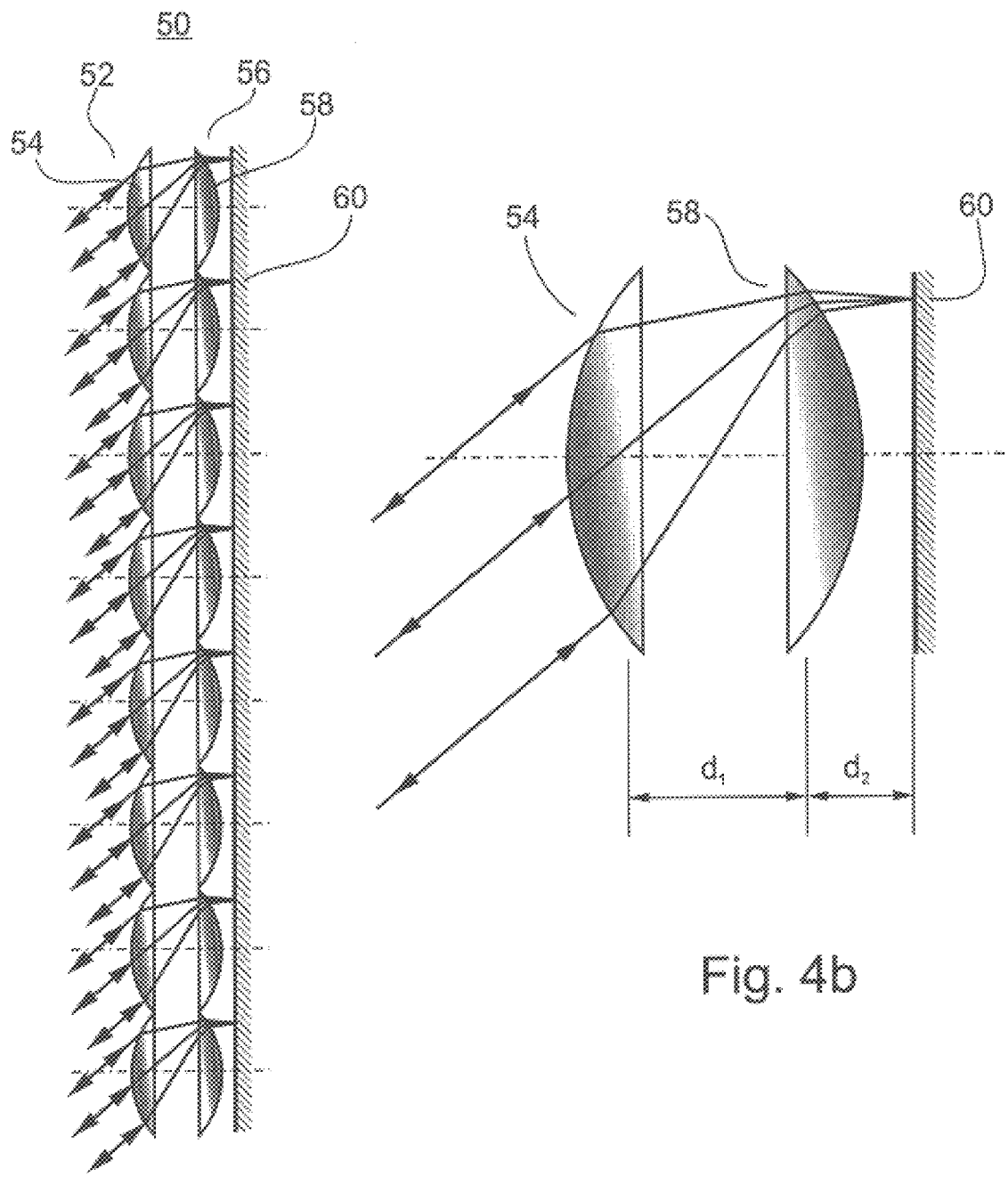
FIGS. 4a–b are cross sectional views of a rear-telecentric retroreflector array according to the present invention; (4a)—an overall cross-sectional view; (4b) a magnified cross section.

The present invention is of a wide acceptance angle directed reflector, such as a retroreflector, which includes a lenticular layer including at least one array of lenslets, and a reflective layer, both disposed and constructed, such that light incident at an angle of incidence on the lenticular layer is reflected by the reflective layer and redirected through the lenticular layer at a substantially constant angle relative to the angle of incidence. More specifically, the present invention is of a directed reflector, such as a retroreflector, designed and constructed as described above and characterized by that the angle of incidence of incoming light on the lenticular layer can range far beyond what characterizes the prior art designs described in the Background section above, while directed-reflection, such as retro-reflection, properties are maintained substantially unchanged. In particular embodiments of the present invention controlled flickering and light modulation effects of the inventive directed reflector are achieved by dedicated-designs. Various uses and applications of directed reflectors, such as retroreflectors are also described. The latter include, for example, (i) a retroreflector utilized in, for example, street and road signs; (ii) a remotely scanable identifier tag, such as a bar-code tag; and (iii) a movement, vibration, or motion detector.

The principles and operation of a directed reflector according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As used herein, the phrase "directed reflector" refers to any reflector capable of reflecting an incident light beam at an essentially constant angle relative to the direction of the incoming light. When this angle is zero degrees with respect to the incident beam, the directed reflector is considered a retroreflector.

Thus, the present invention discloses a wide angle directed reflector, such as a retroreflector, which, in its most basic configuration, is composed of a lenticular layer which includes at least one array of lenslets, each having a focal length; and a reflective layer disposed relative to the lenticular layer. The lenticular layer and the reflective layer of the directed reflector in accordance with the teachings of the present invention are constructed and designed such that light incident at an angle of incidence on the lenticular layer is reflected by the reflective layer and redirected through the lenticular is layer at a substantially constant angle relative to the angle of incidence. A unique feature of the directed reflector of the present invention and which clearly distinguishes the directed reflector of the present invention from the prior art reflectors described in the background section above is that the angle of incidence on the lenticular layer (measured from the normal incidence to the surface of the lenticular layer) may range at least +/- 20° degrees from normal incidence, while the directed reflection, e.g., directed retroreflection properties of the directed reflector of the present invention are retained.

Referring now to the drawings, FIG. 3 illustrates a wide angle retroreflector according to one aspect of the present invention, which is referred to hereinbelow as retroreflector 30. Retroreflector 30 includes a lenticular layer 32 which includes an array of lenslets 34, each having essentially the same focal length. Retroreflector 30 according to this aspect of the present invention further includes a reflective layer 36. In this embodiment of the present invention, reflective layer 36 includes an array of concave reflective elements 38. Reflective elements 38 are coated at their rear (right in the drawing) surface with a specularly reflective material 40, such as, but not limited to, a metallic material. Layers 32 and 36 are so constructed and designed, and reflective layer 36 is disposed relative to lenticular layer 32 such that light incident at an angle of incidence on lenticular layer 32 is retroreflected by reflective layer 36 and redirected through lenticular layer 32 at a substantially zero angle relative to the angle of is incidence. Thus, according to this aspect of the present invention, each concave reflecting element 38 shares essentially the same optical axis as its corresponding lenslet 34. Furthermore, each corresponding reflective surface of reflective layer 36 is placed essentially in the focal plane of the corresponding lenslet. In addition, the radius of curvature of each of the reflective element 38 is such that the this concave surface images the optical center of the corresponding lenslet 34 onto itself via reflection. A small distance, $Z_0$, may separate the common surfaces of lenticular layer 32 and reflective layer 36. Distance $Z_0$, and the radius of curvature and thickness of the concave reflecting elements 38, are selected so that a center of a surface of each of reflective elements 38 is located at a focal plane of its respective lenslet 34. In addition, a radius of curvature of each of reflective elements 38 and $Z_0$ are selected such that each of reflective elements 38 acts as a positive mirror that will image the center of the corresponding lenslet 34 onto itself by reflection. Thus, each reflective element 38 re-image an aperture (exit pupil) of a corresponding lenslet 34 back onto itself. Therefore, all light passing through any lenslet 34 of layer 32 must return to the same lenslet 34, regardless of the angle of incidence of the ray, as long as the light is focused on a corresponding reflective element 38. The condition for meeting this criteria is:

$$|\alpha_{in}| \leq \tan^{-1}\left(\frac{P_{10}}{2F_{10}}\right) \tag{1}$$

where $\alpha_{in}$ is the angle of incidence of incoming light (measured from the normal to the common surface of lenslets 34 of array 32), $F_{10}$ is the effective focal length of each of lenslets 34 and $P_{10}$ is the period, or pitch, of lenslets 34 of layer 32. In the pictured embodiment, distance $Z_0$ is an air space or gap formed between the common surfaces of layers 32 and 36. It will, however, be appreciated that there is no real need for this air space. In other words, the material of one, or both, layers 32 and/or 36 can be made thicker so that the layers physically contact each other ($Z_0$=0), possibly glued together with an optical cement or co-formed from a single, suitably thick, piece of material, and still satisfy the requirements described hereinabove. Furthermore, it will be appreciated that while in the pictured embodiment layer 36 is depicted as a rear surface reflector, a front surface reflector can be similarly employed.

Another configuration of a wide-angle retroreflector in accordance with the teachings of the present invention is depicted in FIGS. 4a–b and is referred to herein as retroreflector. The details of this configuration are herein described in context of the magnified view of FIG. 4b.

In this configuration wide angle directed reflector 50 includes an external array 52 of lenslets 54 and an internal array 56 of lenslets 58, wherein each lenslet 54 and 58 of each of external 52 and internal 56 arrays of lenslets is 54 and 58 includes at least one convex face and a planar or curved opposing face; lenslets 54 and 58 are positive lenslets. Respective lenslets 54 and 58 form lenslet pairs, a single pair is shown in FIG. 4b. It is noted that each lenslet 54 of the array 52 shares a common optical axis with the corresponding lenslet 58 of the array 56. Reflector 50 according to this embodiment of the present invention further includes a planar reflective layer 60. Arrays 52 and 56 and lenslets 54 and 58 are constructed such that for each lenslet pair, incident light passing through the center of the aperture of a lenslet 54 of external array 52 and then through a respective internal lenslet 58 of internal array 56 is rendered normal to reflective layer 60. To this end, the focal length of each of lenslets 58 is selected essentially equal to the distance between this lenslet (58) and the aperture (exit pupil) of its paired lenslet 54. Thus, for each pair of lenslets 54 and 58, a ray that enters through the center of the aperture of lenslet 54 will exit the lenslet 58 parallel to its optical axis and precisely normal to the surface of reflective layer 60. As a result, a ray that passes through both lenslets 54 and 58 of a pair of lenslets is reflected by layer 60 back through the same lenslet 54 through which it entered.

The focal length $F_1$ of each lenslet 54 is selected such that it will focus incoming collimated light onto the surface of layer 60. The values of distances $d_1$, $d_2$, $F_1$ (the focal length of each lenslet 54) and $F_2$ (the focal length of each lenslet 58) are selected so as to satisfy the above condition. As an illustration, if both lenslets 54 and 58 are sufficiently thin, one obtains:

$$F_2 = d_1 \quad (2)$$

and $$\frac{1}{F_2} = \frac{1}{d_2} - \frac{1}{F_1 - d_1} \frac{1}{F_2} = \frac{1}{d_2} - \frac{1}{F_1 - d_1} \quad (3)$$

Substituting $F_2$ from equation (2) into equation (3) and solving for $F_1$ results (in the case of thin lenslets) in:

$$F_1 = \frac{d_1^2}{d_1 - d_2} \quad (4)$$

In practice, the lenslets in the arrays rarely satisfy the conditions of "thin lenses". To compute the values of the parameters for the configuration of FIGS. 4a–b in other cases, one apply the conditions described above to a conventional optical design computer program, such as, for example, the Sinclair Optics' OSLO Six, the Kidger Optics' Sigma 2000 or ORA's CODE V.

It is noted that the reflector configuration of FIGS. 4a–b illustrates one example of a rear-telecentric wide-angle retroreflector array according to the teachings of the present invention. It will be appreciated that other optical devices having a rear-telecentric configuration (see, for example, reference [63]) can also be modified into wide-angle retroreflectors by applying the teachings of the present invention.

Figure 5:
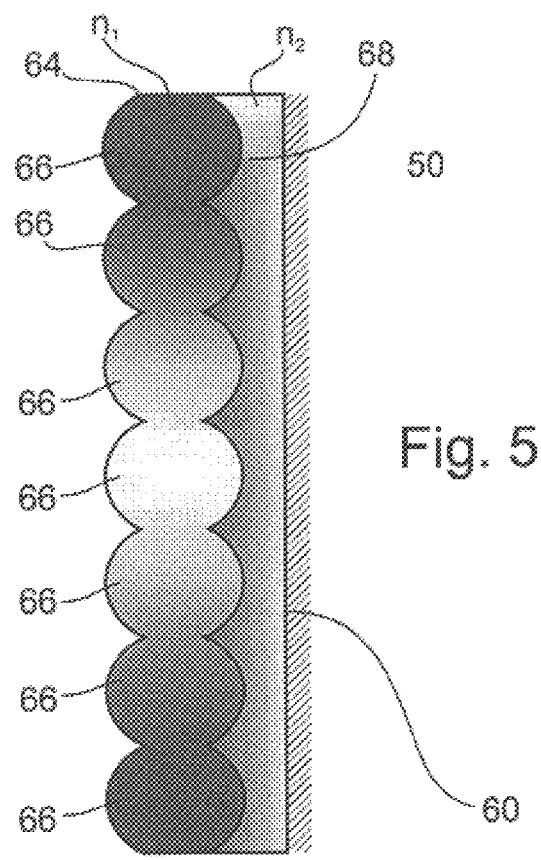
FIG. 5 depicts a monolithic embodiment of a rear-telecentric retroreflector array according to the present invention.

It is noted that the use of an air space between arrays 52 and 56 is shown mainly for clarity. In practice, the two arrays an be made thick enough so that they are physically contacted, possibly glued, or made from a single piece of sufficiently thick material. In such a case, which is specifically shown in FIG. 5, retroreflector 50 includes an array 64 of lenslets 66 each having a pair of opposed internal and external convex faces and a refractive index of $n_1$. According to this "monolithic" configuration, retroreflector 50 further includes a plano concave array 68 having a refractive index $n_2$ and a radius of curvature which follows the curvature of the internal face of array 64 Thus, according to this configuration of retroreflector 50, arrays 64 and 68 are held (possibly glued) together with essentially no gap therebetween. Provided that $n_1 > n_2$, array 64 acts as a positive lenslet array; therefore, assuming a correct selection of thickness and the radii of curvature of the arrays, the monolithic configuration of retroreflector 50 ] functions similarly to the non-monolithic retroreflector 50 described under FIGS. 4a–b. Thus, the external face of array 64 of the monolithic configuration of retroreflector 50 is the functional equivalent of lenslets 54 of array 52 of the non-monolithic configuration thereof. Similarly, the internal face of array 64 of the monolithic configuration of retroreflector 50 is the functional equivalent of lenslet 58 of array 56 of the non-monolithic configuration thereof. Rear surface 60 of plano-concave array 68 is mirrored, as such the monolithic configuration of retroreflector 50 does not require an independent reflective layer. Appropriate radii of curvatures of the internal and external faces and thickness of arrays 64 and 68 can be readily calculated using the software programs described herein above.

Thus, both the monolithic and non-monolithic configurations of retroreflector 50 according to the teachings of the present invention will provide larger angle of acceptance and a higher retroreflection coefficient as compared to prior art designs.

According to another aspect of the present invention the wide angle directed reflector can also be utilized as a non-retroreflector.

To generate directed, non-retroreflection, the wide angle directed reflector according to the present invention is configured such that the substantially constant angle between the incident light and the reflected light is substantially greater than zero.

There are several configurations that can be utilized by the directed reflector of the present invention in order to provide directed non-retro, reflection.

To enable directed non-retroreflection the conditions for retroreflection which are followed by the retroreflector configuration described hereinabove must be violated. For example, in retroreflector 30 described hereinabove, the condition for retroreflection is given by:

$$-\tan^{-1}\left(\frac{P_{10}}{2F_{10}}\right) \le \alpha_{in} \le \tan^{-1}\left(\frac{P_{10}}{2F_{10}}\right) \quad (5)$$

is Similarly, for retroreflector 50 the condition is given by:

$$-\tan^{-1}\left(\frac{P_1}{2F_1}\right) \le \alpha_{in} \le \tan^{-1}\left(\frac{P_1}{2F_1}\right) \quad (6)$$

where $P_1$ is the period (pitch) of lenslet 66 in array 64.

In this case when the absolute value of the angle of incidence, $|\alpha_{in}|$ (where angle $\alpha_{in}$ is measured from the normal to the surface of the array) increases beyond a threshold, the reflected light does not exit from the lenslet it came in through, and the conditions for retroreflection are violated.

To simplify the analysis of optical systems that include mirrors or other reflecting elements, such systems are 'unfolded' to an optically equivalent system by replacing reflective elements with equivalent transitive elements. As such, in an equivalent unfolded system a light beam is depicted as moving in one direction.

Figure 6:
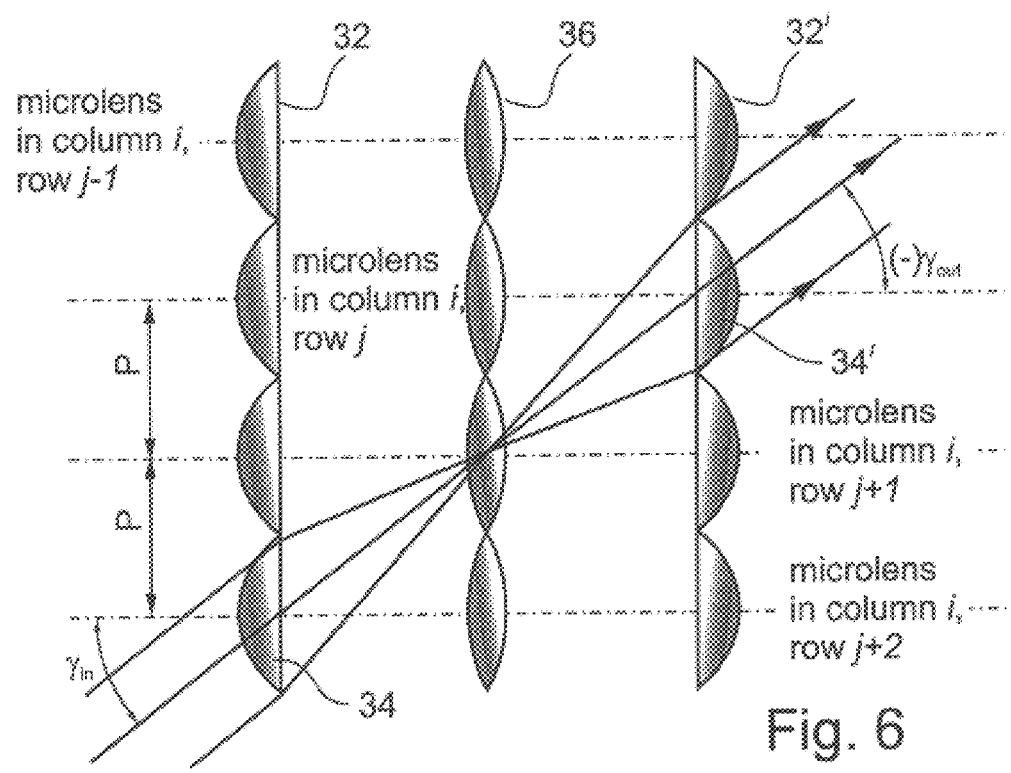
FIG. 6 depicts an unfolded view of a retroreflector according to the present invention illustrating the paths of incident light beams.

FIG. 6 illustrates an equivalent unfolded system of reflector 30. Array 32 is drawn twice as arrays 32 and 32', wherein the array at the center is the transitive equivalent of concave reflector array 36. Thus, in this unfolded view, light entering lenslet 34 of array 32 (positioned at column i, row j+2) at an angle $\gamma_{in}$, exits the retroreflector 30 through lenslet 34' of array 32' (positioned at column i, row j) at an inverse angle $\gamma_{out}$ (note that in FIG. 6, the depicted value of $\gamma_{out}$ is negative). Simple calculations prove that this occurs when:

$$\tan^{-1}\frac{P}{2F} < \gamma_{in} \le \tan^{-1}\frac{3P}{2F} \quad (7)$$

where F is the focal length and P is the period of lenslets 34 (and 34') in arrays 32 (and 32'), respectively.

Thus, for this range of $\gamma_{in}$ the beam deviation is represented by:

$$\Delta\gamma \stackrel{def}{=} \gamma_{in} - \gamma_{out} = \gamma_{in} - \tan^{-1}\left(\tan\gamma_{in} - \frac{2P}{F}\right) \quad (8)$$

$$\Delta\gamma \stackrel{def}{=} \gamma_{in} - \gamma_{out} = \gamma_{in} - \tan^{-1}\left(\tan\gamma_{in} - \frac{2P}{F}\right)$$

For small array period one can assume that P<<F, so that $$\Delta\gamma \approx \frac{2P}{F}.$$

Within this range of $\gamma_{in}$, $\Delta\gamma$ is independent of $\gamma_{in}$ and does not equal zero, therefore a directed reflector under such conditions is not a retroreflector. For other ranges of $\gamma_{in}$ different values of $\Delta\gamma$ are expressed by:

$$\Delta\gamma = \begin{cases} \vdots & \vdots & \vdots & (9) \\ \gamma_{in} - \tan^{-1}\left(\tan\gamma_{in} + \frac{2P}{F}\right) & \text{when} & -\tan^{-1}\frac{3P}{2F} < \gamma_{in} \leq -\tan^{-1}\frac{P}{2F} \\ 0 & \text{when} & -\tan^{-1}\frac{P}{2F} < \gamma_{in} \leq \tan^{-1}\frac{P}{2F} \\ \gamma_{in} - \tan^{-1}\left(\tan\gamma_{in} - \frac{2P}{F}\right) & \text{when} & \tan^{-1}\frac{P}{2F} < \gamma_{in} \leq \tan^{-1}\frac{3P}{2F} \\ \gamma_{in} - \tan^{-1}\left(\tan\gamma_{in} - \frac{4P}{F}\right) & \text{when} & \tan^{-1}\frac{3P}{2F} < \gamma_{in} \leq \tan^{-1}\frac{5P}{2F} \\ \gamma_{in} - \tan^{-1}\left(\tan\gamma_{in} - \frac{6P}{F}\right) & \text{when} & \tan^{-1}\frac{5P}{2F} < \gamma_{in} \leq \tan^{-1}\frac{7P}{2F} \\ \vdots & \vdots & \vdots \end{cases}$$

For P<<F one obtains the following:

$$\Delta\gamma \approx \begin{cases} \vdots & \vdots & \vdots & (10) \\ -\frac{2P}{F} & \text{when} & -\frac{3P}{2F} < \gamma_{in} \leq -\frac{P}{2F} \\ 0 & \text{when} & -\frac{P}{2F} < \gamma_{in} \leq \frac{P}{2F} \\ \frac{2P}{F} & \text{when} & \frac{P}{2F} < \gamma_{in} \leq \frac{3P}{2F} \\ \frac{4P}{F} & \text{when} & \frac{3P}{2F} < \gamma_{in} \leq \frac{5P}{2F} \\ \frac{6P}{F} & \text{when} & \frac{5P}{2F} < \gamma_{in} \leq \frac{7P}{2F} \\ \vdots & \vdots & \vdots \end{cases}$$

Thus, for a given lenslet period and ranges of $\gamma_{in}$, $\Delta\gamma$ is independent of $\gamma_{in}$. The range defined by $$-\frac{P}{2F} < \gamma_{in} \leq \frac{P}{2F}$$

satisfies the conditions for retroreflection. Other ranges define non-retroreflecting directed reflectors.

It will be appreciated that the above described conditions can apply to any of the lenslet array based retroreflectors described hereinabove. For $d_2 << d_1$ of 50 (FIG. 4b) equations (9) and (10) can be directly applied. Otherwise, a precise value of $\Delta\gamma$ and the range boundaries for $\gamma_{in}$ will be slightly different in this configuration, however the overall function will be similar.

There are several methods for producing non-retroreflecting directed reflectors according to the present invention. Specifically such directed reflectors have non-retroreflecting regions that are closer to, and, if possible, include, the on-axis direction $\gamma g_{in}=0$.

Figure 7:
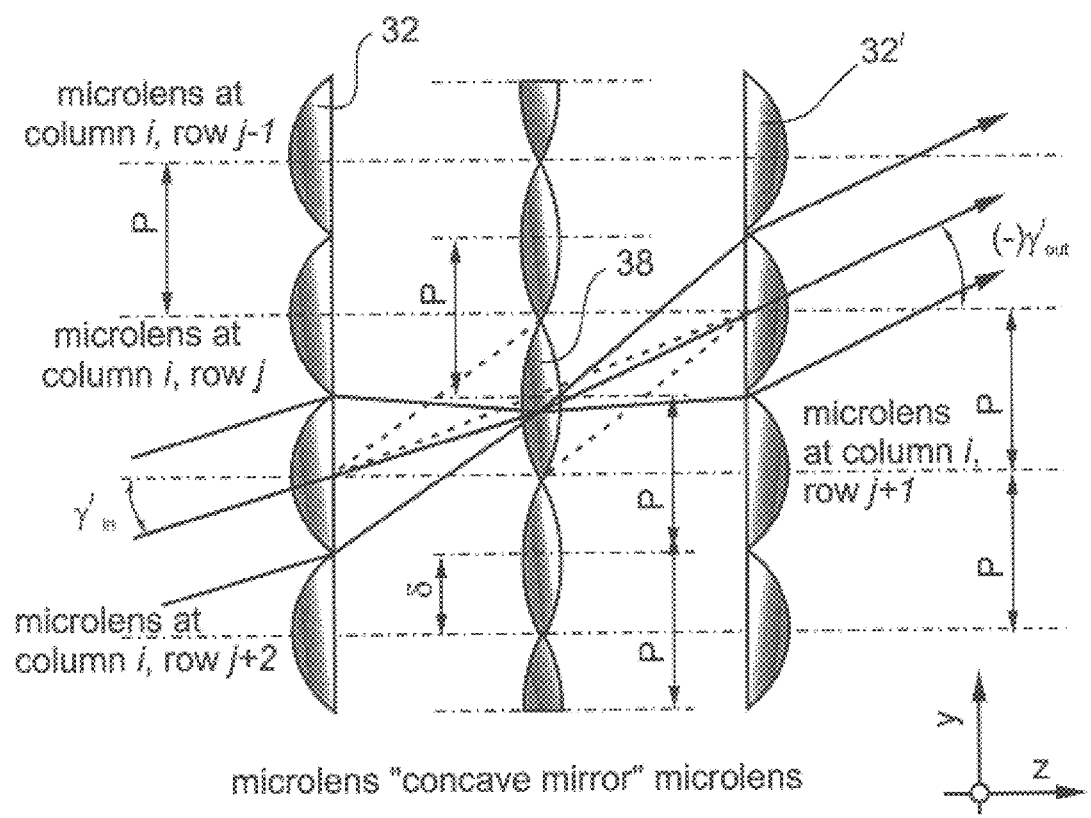
FIG. 7 is an unfolded view similar to that shown in FIG. 6 with the exception that the reflective layer is now shifted.

FIG. 7 illustrates an equivalent unfolded depiction of directed reflector 30 described in FIG. 3, with the exception that reflective elements 38 are now shifted out of alignment with respect to array 32 (represented by 32 and 32' in the unfolded system depicted FIG. 7).

For the purposes of illustration, the following description follows a case where the shift, $\delta d$, equals P/2, where P equals the distance between focal points of adjacent lenslets of the same array. It will be appreciated however, that other values of $\delta d$ can also be utilized by the present invention. The following equation describes the conditions for a directed reflector when $\delta d \neq 0$:

$$\Delta\gamma' = \qquad (11)$$

$$\begin{cases} \vdots & \vdots & \vdots \\ \gamma'_{in} - \tan^{-1}\left(\tan\gamma'_{in} + \frac{2P}{F}\right) & \text{when} & -\tan^{-1}\frac{2P}{F} < \gamma'_{in} \leq -\tan^{-1}\frac{P}{F} \\ \gamma'_{in} - \tan^{-1}\left(\tan\gamma'_{in} + \frac{P}{F}\right) & \text{when} & -\tan^{-1}\frac{P}{F} < \gamma'_{in} \leq 0 \\ \gamma'_{in} - \tan^{-1}\left(\tan\gamma'_{in} - \frac{P}{F}\right) & \text{when} & 0 < \gamma'_{in} \leq \tan^{-1}\frac{P}{F} \\ \gamma'_{in} - \tan^{-1}\left(\tan\gamma'_{in} - \frac{2P}{F}\right) & \text{when} & \tan^{-1}\frac{P}{F} < \gamma'_{in} \leq \tan^{-1}\frac{2P}{F} \\ \vdots & \vdots & \vdots \end{cases}$$

These expressions can be simplifies for a small period (P<<F) to extract the following:

$$\Delta\gamma' \approx \begin{cases} M & M & M & (12) \\ -\frac{2P}{F} & \text{when} & -\frac{2P}{F} < \gamma'_{in} \leq -\frac{P}{F} \\ -\frac{P}{F} & \text{when} & -\frac{P}{F} < \gamma'_{in} \leq 0 \\ \frac{P}{F} & \text{when} & 0 < \gamma'_{in} \leq \frac{P}{F} \\ \frac{2P}{F} & \text{when} & \frac{P}{F} < \gamma'_{in} \leq \frac{2P}{F} \end{cases}$$

In this case, several regions of a directed reflector according to the present invention function in directed non-retroreflection. It will be appreciated that although the directed reflector according to this embodiment of the present invention does not contain regions which function in retroreflecting incident light beams, imprecise fabrication may produce a small region of retroreflection centered at $\gamma g'_{in}=0$.

Figure 8:
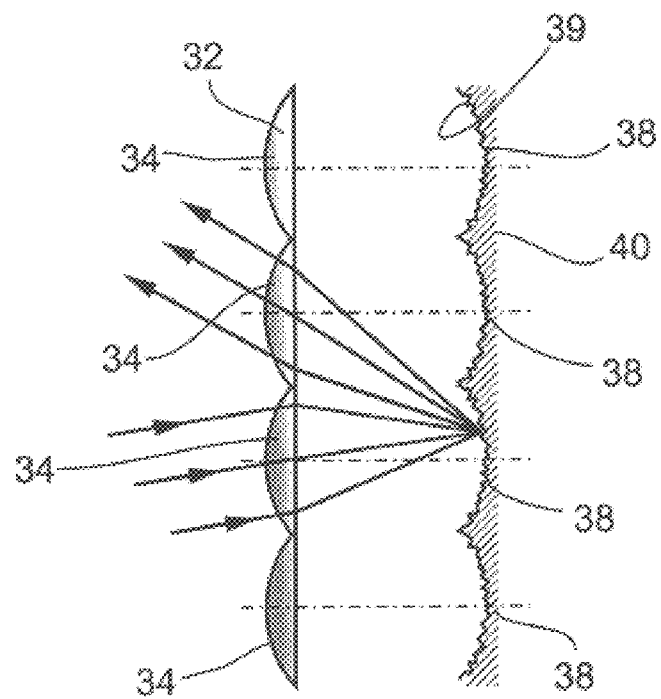
FIG. 8 is a cross sectional view of one embodiment of a directed non-retroreflector according to the present invention including corrugations on a concave reflective layer.

Another configuration of a directed non-retroreflector according to the present invention is shown in FIG. 8. The directed non-retroreflector according to this embodiment is similar in configuration to retroreflector 30 shown in FIG. 3. However, in order to function as a directed non-retroreflector, concave reflective elements 38 of this configuration include corrugations 39 formed along the surface thereof. Corrugations 39 have typically saw-tooth like profile. The depth of Corrugations 39 can be either smaller or nearly equal, or substantially larger, than the wavelength of the light. When corrugations 39 are smaller than (or nearly equal to) a wavelength they act as a blazed grating. Alternatively, when corrugations 39 are relatively large (at least several wavelengths) they act as a Fresnel prism.

Yet another configuration of a directed non-retroreflector of the present invention can utilize a thick, off axis, Bragg-Denisyuk reflection hologram [3] utilized either as diffraction grating on the curved surface of concave reflective elements 38, or as a flat surface which combines the focusing and the light deviating functions of the corrugated concave reflective elements 38 described above. In any case, assuming a relatively small period of P<<F, the deviation angle caused by corrugations or the hologram would satisfy the following condition:

$$\varphi = k\frac{P}{2F} \qquad (13)$$

where k is a small integer greater than zero. Thus, light coming in at an angle $\gamma g''_{in}$ will exit with a deviation of $\Delta D\gamma g''$ from the original path, where:

$$\Delta \gamma' = k\frac{P}{F} \qquad (14)$$

Figure 9:
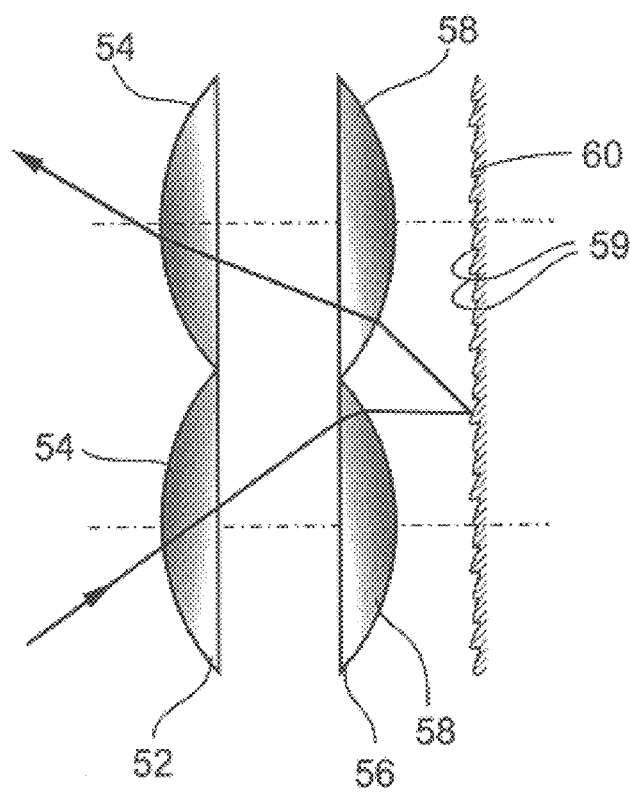
FIG. 9 is a cross sectional view of another embodiment of a directed non-retroreflector according to the present invention including corrugations on a planar reflective layer.

As specifically shown in FIG. 9, a directed non-retroreflector of the present invention can also be configured similar to retroreflector 50 described in FIGS. 4a–b. Since this configuration employs a planar reflective layer 60, the grating or the Fresnel prism can easily be fabricated thereupon by introducing corrugations 59 using any common grating or Fresnel prism fabrication method such as a ruling machine, microlithography with multiple imaging and etching cycles; holography, or the like.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

As described in the Background section above, prior art retroreflectors are limited by design to the reflection of incident light back to the light source. In addition, prior art retroreflectors are typically limited by low acceptance angles for incident light. There are applications, however, for which one or both of these functions, which are lacking from prior art reflectors, are important.

Some applications, require sufficiently bright reflection from the retroreflector such as, for example, the retroreflector array left by the Apollo mission on the moon as well as retroreflecting traffic signs at public highways. For other applications, a directed reflector which is not a retroreflector or a special retroreflector can be utilized to convey some information via reflected light. For example, a bar code design with a simple retroreflector can be used to transmit information using minimal or no power consumption by the retroreflector.

Thus, as described herein, the present invention provides directed reflectors capable of accepting light incident from a wide range of angles and reflecting the incident light at a generally constant return angle relative to the angle of incidence. As is further described in detail hereinbelow the directed reflector of the present invention can be utilized for a variety of applications.

Example 1

Flicker Effect

Flicker, or intermittent reflection, is useful for attracting attention or for transmitting information. Low frequency flicker (0.2 to 10 Hz) is highly noticeable by the human eye and thus can be utilized to attract the attention of motorists and the like. Higher frequencies, 1 KHz and above, can be utilized for communication. Retroreflectors are inherently advantageous for such applications since they do not produce light and as such do not consume energy.

Direction Dependent:

Preferably flickering retroreflectors are entirely passive requiring no power source.

Figure 10:
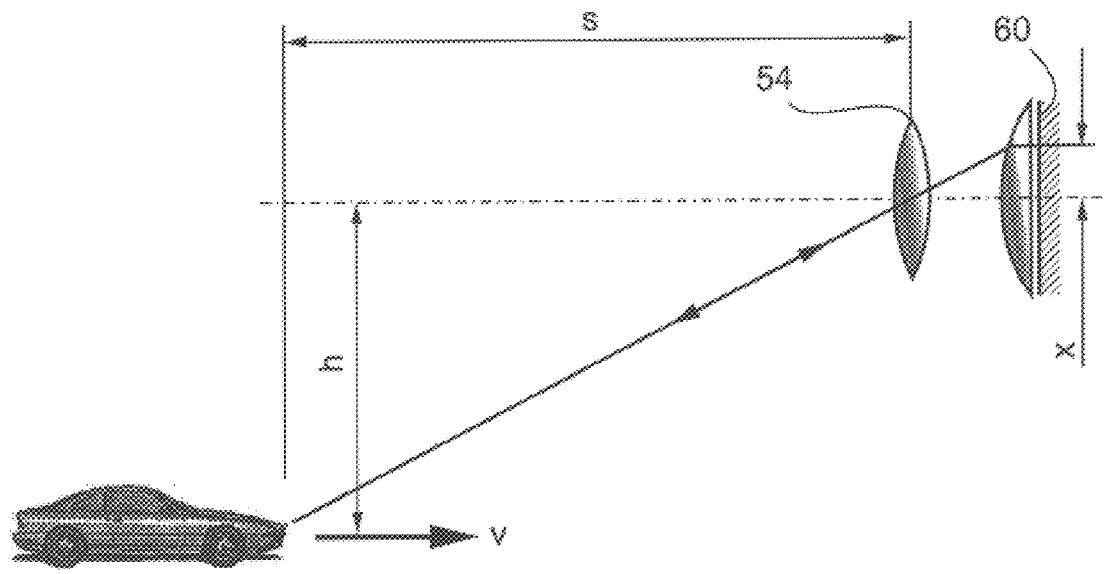
FIG. 10 depicts a road sign incorporating a retroreflector of the present invention incorporating a light modulating layer and capable of motion induced retroreflector flicker.

FIG. 10 illustrates a single cell of a multi-cell retroreflector according to any of the embodiments of the present invention described above. A plurality of such cells can be positioned, for example, on a road sign. As a vehicle on the road approaches the road sign, the illuminated point on the reflective layer 60 of the retroreflector moves as the vehicle moves towards the sign, since the angle of incidence on lenslet 54 changes. Thus, the location of the illuminated point relative to the axis of any lenslet, $x_l$ can be described by:

$$x_l = \frac{hF_l}{S} \qquad (15)$$

where h is the height of the sign above the vehicle, S the horizontal distance between the vehicle and the sign, and $F_l$ is the effective focal length of lenslet 54 of the retroreflector. As the vehicle approaches the sign at a velocity v, S changes according to the following equation:

$$S = S_0 - vt \qquad (16)$$

where t is the time and $S_0$ is the position the vehicle occupied when t=0.

By using equations (15) and (16) one can obtain the velocity x', at which a light spot inside the retroreflector is moving:

$$x' = \frac{hF_l v}{(S_0 - vt)^2} = \frac{hF_l v}{S^2} \qquad (17)$$

It will be appreciated that this equation can only be utilized for S>0; furthermore, retroreflection cannot be expected to occur when $x_l > P_l/2$, where $P_l$ is the period (pitch) of the retroreflector array, thus S must satisfy the following condition:

$$S > \frac{2hF_l}{P_l} \qquad (18)$$

If suitable horizontal non-reflecting strips are placed in or on each retroreflector cell, no retroreflection will be affected when light from the vehicle is focused by lenslet 54 on any of these strips. Therefore, the driver in the moving vehicle will see flickering retroreflected light.

To further illustrate this aspect of the present invention, the following parameters are used as an example for calculations, v=80 km/h, $F_l$=1 mm, $P_l$=0.5 mm and h=3.5.

Figure 11:
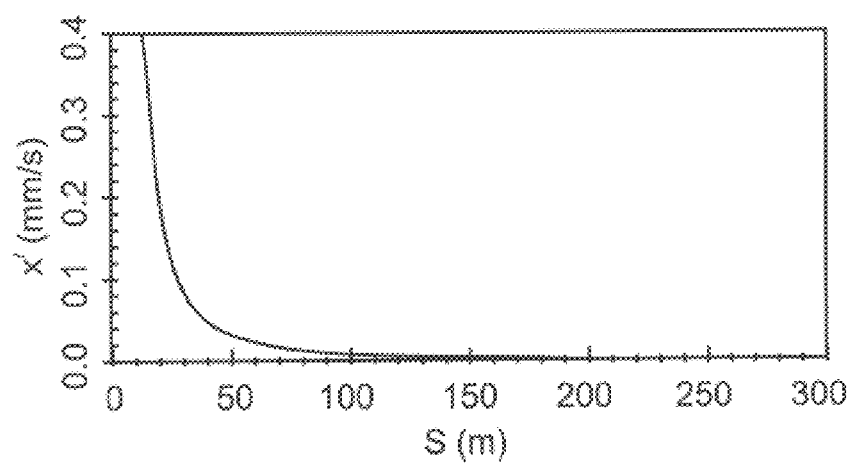
FIG. 11 is a graph describing the velocity of a spot of light on the reflective layer of the retroreflector of FIG. 10 as a function of distance from an approaching light source, where S is the horizontal distance and x' is the velocity of the spot of light created by the incoming beam on the reflector.

Using these parameters yields a retroreflector which is effective at S values smaller than 14 meters. FIG. 11 shows x' (S) for the values of this example, x' being the velocity of the focused spot on the reflector 60 (the is derivative of $x_l$ in respect to time t). From x' (S) one can calculate the density, or spatial frequency, $f_x$, of non-reflecting lines that are needed to produce flicker at the required temporal frequency $f_t$. The relation is:

$$f_x = \frac{f_t}{x'} = \frac{f_t S^2}{hF_l v} \quad (19)$$

Figure 12:
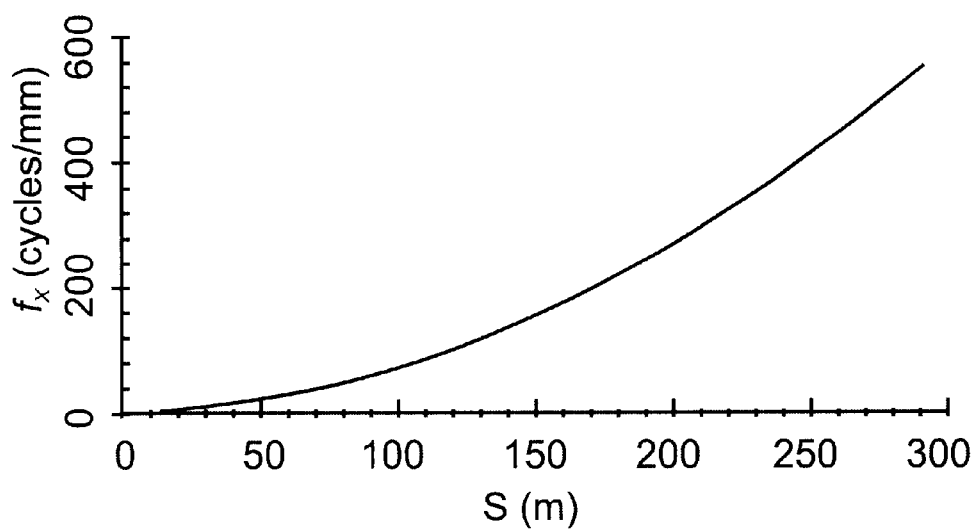
FIG. 12 is a graph depicting the spatial frequency $f_x$ of non-reflecting lines disposed on or in front of the reflective layer of the directed reflector of the present invention as a function of distance.
Figure 13:
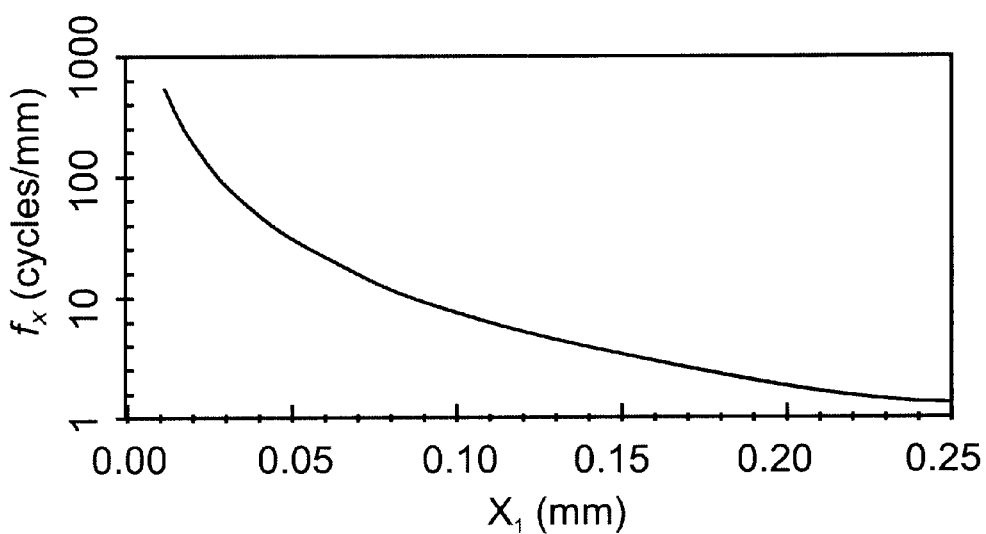
FIG. 13 is a graph depicting the spatial frequency $f_x$ of non-reflecting lines disposed on or in front of the reflective layer of the directed reflector of the present invention (see FIG. 10) as a function of the position of a spot of light on their reflective surface.

FIGS. 12 and 13 illustrate the relationship between spatial frequency and the distance (S) and the location on the retroreflector of a retroreflecting point $x_l$. A variable spatial frequency pattern, configured according to data similar to that presented in FIG. 13, will produce a flickering retroreflected light visible to a motorist of an approaching vehicle.

Figure 14:
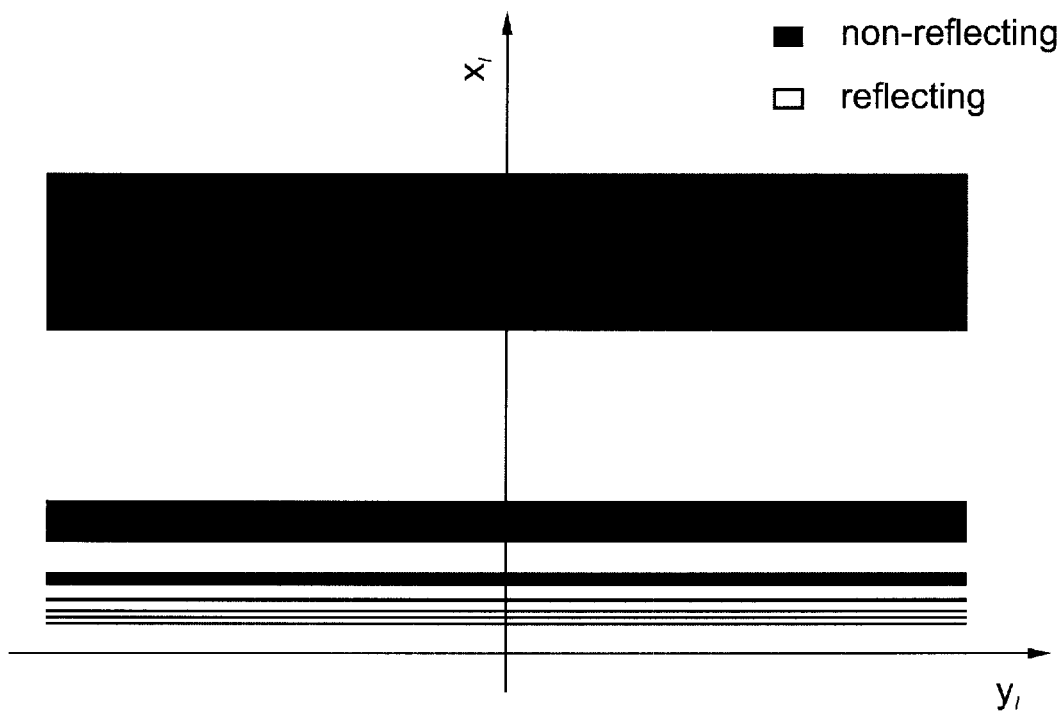
FIG. 14 depicts the non-reflecting (opaque) zones of one embodiment of a flickering retroreflector according to the present invention.

FIG. 14 illustrates the pattern of reflecting and non-reflecting zones of each retroreflector cell produced as described above. This pattern is utilized to obtain motion-induced flicker and is derived from the following calculation:

$$\text{Zone type} = \begin{cases} \text{reflecting if} & \sin(2\pi f_x + \varphi) \geq 0 \\ \text{non-reflecting} & \text{otherwise} \end{cases} \quad (20)$$

where, $x_l$ is as defined for equation (19), and $\phi j$ is an arbitrary selected spatial phase constant.

FIGS. 11 through 14 exemplify one embodiment of flickering retroreflectors. The precise pattern of non-reflecting zones on each retroreflecting cell does not have to follow the example given above. The values used in the above described example which define retroreflective sign height, lenslet effective focal length, desired flicker frequency, and the like, are not considered as optimum values for any specific application but are intended for the purposes of better illustrating this aspect of the present invention.

In addition, other flickering reflection schemes can be utilized by the present invention. For example, variable reflectivity patterns rather than simple on/off patterns can be utilized by this aspect of the present invention. Thus, rather than using equation (20), one may use the reflectivity function $R(x_l, y_l)$ (21), determined by:

$$R(x_l, y_l) = \frac{1}{2}[\sin(2\pi f_x x_l + \phi) + 1] \quad (22)$$

Likewise, using variation in the color of the reflected light rather than its intensity can also be implemented. For example, the dark non-reflective zones illustrated in FIG. 14 may be replaced by blue reflecting zones whereas the light reflecting areas may be made to reflect red light. In addition, the shape of these zones may be varied so as to produce a non-uniform flickering rate, increasing for example, as the vehicle approaches the sign. In cases where the reflective sign is positioned at a side of the road (rather than overhead as exemplified hereinabove) these zones are preferably positioned on each retroreflector cell in a vertical pattern rather than a horizontal pattern. In cases where the vehicle moves above the sign (aircraft, for example), the pattern is preferably positioned on the bottom portion of each retroreflector cell, rather than on its top portion.

In addition, different patterns of retroreflecting elements can be utilized on the sign, so as to produce not just simple flicker, but a sensation of moving pattern of light on the sign.

Mechanical Flickering Retroreflectors:

Flickering light can also be generated from reflecting elements by varying the distance between the lenslets and the reflectors.

Figure 15:
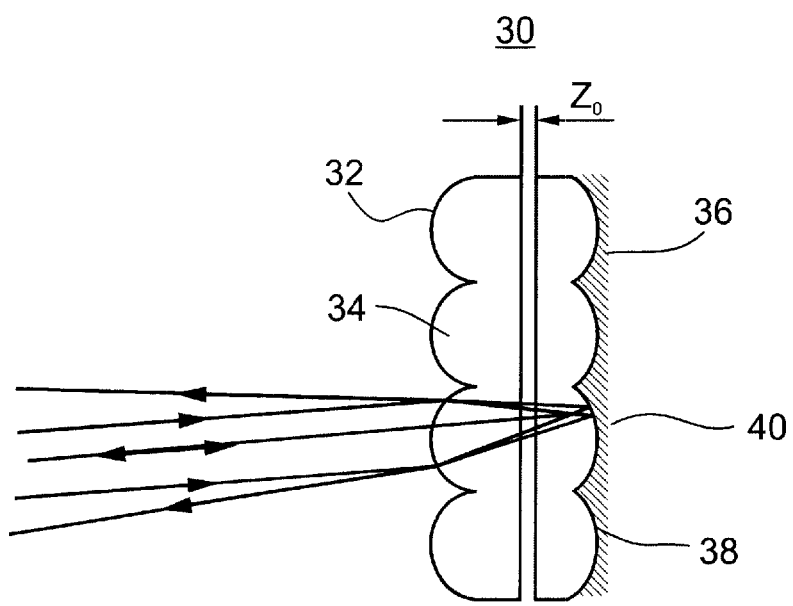
FIG. 15 is a cross sectional view of the retroreflector of FIG. 3, illustrating the path of reflected light when the distance between the lenticular array and the reflective layer is altered.

As specifically shown in FIG. 15, when the distance between array 32 and reflective layer 36 is incorrect for retroreflection, a diverging or converging reflected beam is generated. Such a beam distributes the light on a large area, resulting in low retroreflected beam intensity. This phenomenon can be utilized to produce a retroreflector with a modulated retroreflected beam.

Figure 16:
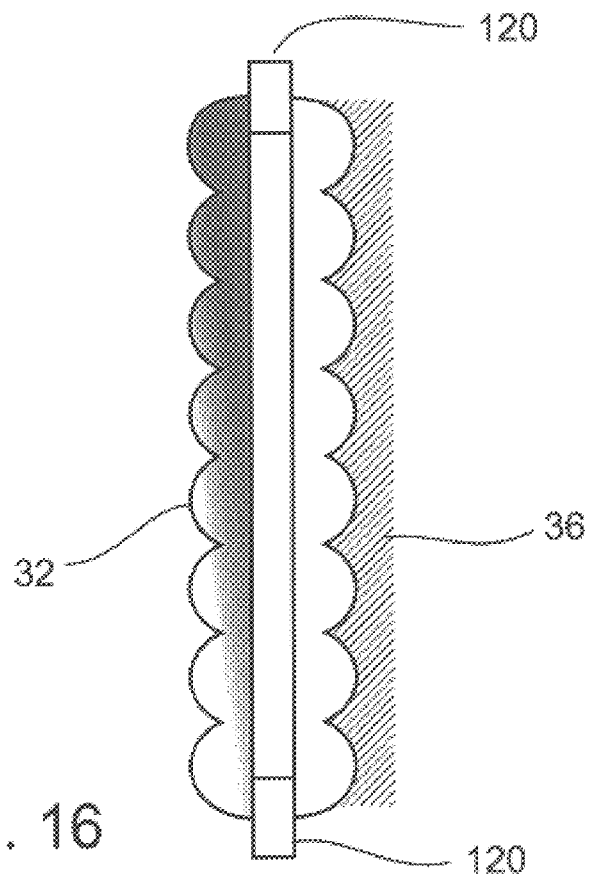
FIG. 16 is a cross sectional view of a retroreflector according to the present invention provided with a directed reflection controlling mechanism.

Thus, according to another aspect of the present invention and as specifically shown in FIG. 16, a directed reflector according to any of the embodiments described hereinabove can also include a directed reflection controlling mechanism 120 being designed and constructed to controllably alter given relative separation of layers 32 and 36 such that light incident on lenticular layer 32 is reflected by reflective layer 36 and redirected through lenticular layer 32 as diverging rather than collimated beam.

By utilizing such mechanism 120 the distance $Z_0$ separating layers 32 and 36 can be effected in response to, for example, an electric signal. Mechanism 120, can include piezoelectric actuators, see for example, reference [58] or voice-coil actuators (linear electromagnetic actuator similar to those used in loudspeakers). The actuator can receive a periodic signal, thus periodically altering $Z_0$. For example, if the following equation is utilized:

$$Z_0(t) = Z_c + \frac{1}{2}\alpha Z[1 + \sin(2\pi f_t t)] \quad (23)$$

where t represents time, $Z_c$ is the value of $Z_0$ for which each retroreflector cell returns a well collimated beam, and $Z_c + \Delta DZ$ is a value of $Z_0$ for which the returned beam diverges enough to make the retroreflected beam intensity sufficiently low, the retroreflected light intensity will flicker at a temporal frequency of $f_t$.

It will be appreciated that $\Delta DZ$ is selected sufficiently small so as to have a noticeable effect on the reflected light intensity. Although electrical power is utilized to produce the mechanical motion, power expenditure of this flickering retroreflector can be relatively low.

Variations of this configuration can produce, for example, non-periodic flickering, used, for example, to transmit information via the retrobeam, and non-equal motion $Z_0(t)$ for different regions of the retroreflector. In addition, a retroreflector array can be programmed (by selecting a suitable set of functions $Z_{0,i,j}(t)$ for each of the retroreflector cells located at column i, row j) to display, in the retroreflected light, moving patterns, changing signs, etc.

Figure 17:
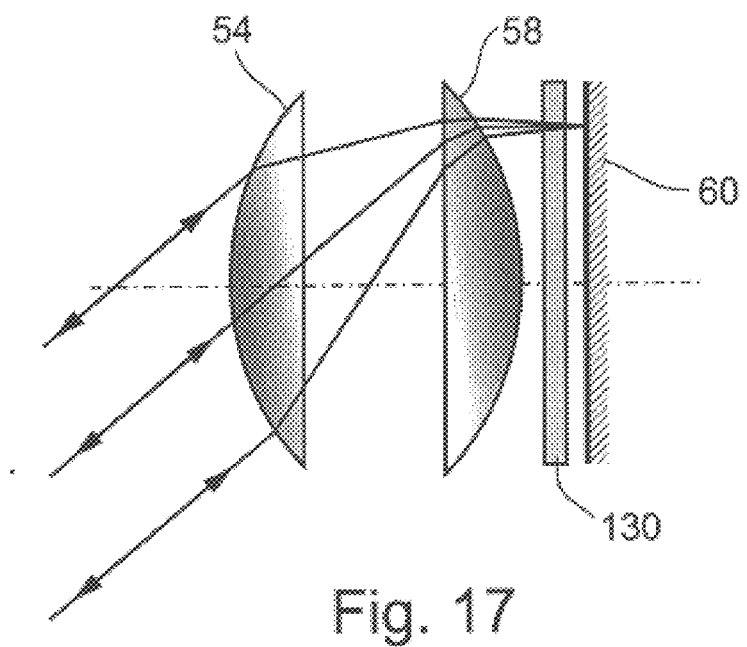
FIG. 17 is a cross sectional view of a single cell of a retroreflector provided with a light modulating layer according to the present invention.

Light Modulating Flickering Retroreflectors:

Another configuration for producing modulated retroreflected beams is shown in FIG. 17. This configuration is based on the use of a light modulating layer positioned inside or in front of a retroreflector, preferably between the lenslet array and the reflective layer. It will be appreciated that any of the retroreflector embodiments described above can be configured to include such a light modulating layer. According to this configuration a light modulating layer 130 is placed just in front of reflective element 60. Modulating layer 130 can include, for example, a liquid crystal element (for example, ferroelectric effect liquid crystal, FLC) with suitable polarizers, or any other element capable of modulating light in response to electric signal. By utilizing the rear-telecentric retroreflector configuration illustrated in FIGS. 4a–b the incoming light will always go through modulating layer 130 perpendicularly, regardless of the angle of the incident light beam.

By utilizing any of the retroreflectors of the present invention which are capable of accepting wide angle incident beams, light modulators that have narrow angles of acceptance can be utilized. Light modulators with narrow angles of acceptance are less expensive than other light modulators, are more widely available, and often produce better modulation and faster response. For example, by using FLC modulators, one can obtain high contrast modulation with very low power consumption at frequencies in the MHz range. A retroreflector utilizing such modulators can be powered by photovoltaic cells, and as such no external power or recharging is necessary. Alternatively, a spatial light modulator can be used in place of the simple modulator described above. A spatial light modulator (SLM), also known as a light valve, is a device capable of modulating light differently at each point of its surface. For example, some liquid crystal display (LCD) devices can be utilized as an SLM. If the size of the pixels (resolution units) in the SLM is a fraction of the pitch of the lenslets, light incident from different directions will impinge on different sets of SLM pixels. A retroreflector provided with an SLM can modulate retroreflected light differently, as function of the angle of incidence.

Such an SLM based retroreflector can be utilized for various applications. For example, a different flicker rate can be generated when the retroreflector is viewed from different directions, a flicker can be produced in only a part of the retroreflector, enabling to display images or text which flicker, move or change.

Example 2

Reflector Identifier Tags

As described in the prior art (see for example, U.S. Pat. Nos. 5,237,164 and 5,118,930) a simple retroreflector can be utilized as an identification tag. However, such prior art identifier tags suffer from several inherent limitations resultant from the retroreflectors utilized thereby.

Because of its superior light collection and reflection qualities the directed reflector of the present invention can be utilized in an identifier tag which would not suffer from the performance limitations characterizing prior art retroreflector identifier tags.

In general, retroreflector identification systems offer several advantages over other configurations, as follows: (i) simple light can be used for readout; unlike some radio or microwave based devices no potentially harmful radiation is generated or needed; (ii) identification of retroreflector provided codes can be effected from a distance of meters, instead of centimeters as in most other optical devices; and (iii) retroreflector provided codes can use multiple identification means to enhance security, yet still be cost effective.
Spatial Encoding:

Simple retroreflective road signs display a pattern, such as text or an icon, by simple imprinting over a retroreflector, or by cutting pieces of different retroreflective materials and composing them together (see, for example, U.S. Pat. No. 5,237,164).

Figure 18:
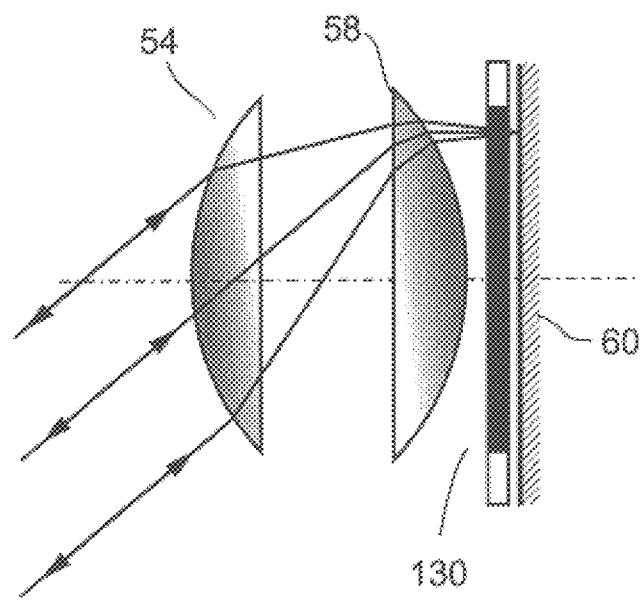
FIG. 18 is a cross sectional views of a single cell of a retroreflector provided with a light modulating layer capable of spatially encoding reflected light according to the teachings of the present invention.

As already mentioned above, the present invention proposes the incorporation of a pattern-carrying light modulating layer inside the retroreflector as opposed to outside the directed reflector as described in the prior art. This embodiment of a light modulating layer 130, which is shown in FIG. 18, serves for blocking or attenuating light entering selected retroreflecting cells (either entirely or in some wavelength ranges) such that these cells either do not retroreflect, or their retroreflected light is weaker or of a specific wavelength or a specific combination of wavelengths. An identifier tag according to the teachings of the present invention possesses several advantages over prior art directed reflector tags, as follows: (i) such a tag is difficult to tamper with or counterfeit, thus providing a higher level of security as compared to prior art tags; (ii) when using the particular rear-telecentric retroreflecting construction shown in FIG. 18, the path of the light through patterned light modulating layer 130 does not depend on the direction of incoming illumination, since internally, light is always perpendicular to reflective element 60 and layer 130. As such, the level of light attenuation (e.g., color) is independent of the light incidence angle; and (iii) the pattern carrying light modulating layer is protected from adverse environmental conditions.

As is further detailed below, a directed reflector identifier tag according to the present invention can be readily combined with other security measures, allowing the construction of a single identification card that may be used with different readout devices for different levels of security.
Spectral Encoding:

The identification and/or verification data contained in a directed reflector identifier tag according to the present invention can be encoded by a spectral distribution of the retroreflected light. For example, a readout device can contain a spectrometer or a set of spectral filters that is used to detect the spectrum and compare it, for example, to spectra contained in a lookup table stored in a memory device.

Figure 19A:
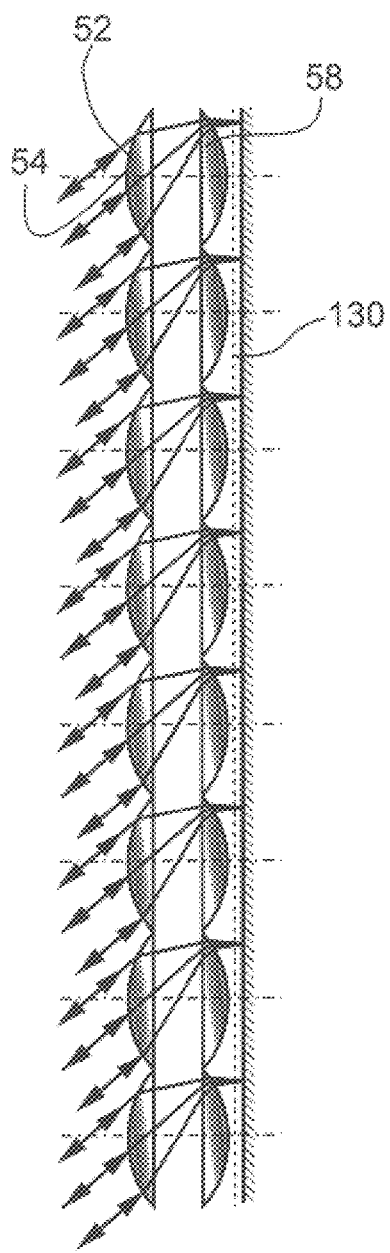
FIGS. 19a–b are cross sectional views of a retroreflector (FIG. 18a) and a single cell thereof (FIG. 18b) provided with a light modulating layer capable of angularly encoding reflected light according to the teachings of the present invention.
Figure 19B:
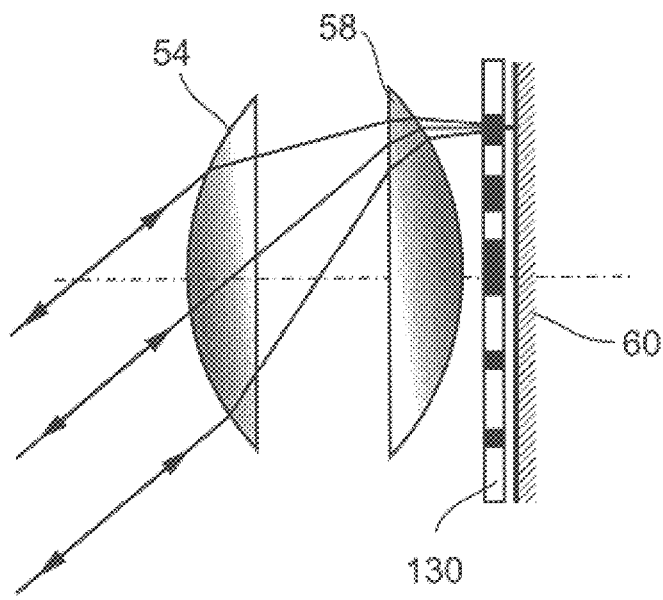
Figure 20A:
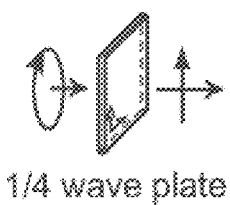
FIGS. 20a–f depict light modulating effects obtainable with various prior art light polarizers and wave plates.
Figure 20B:
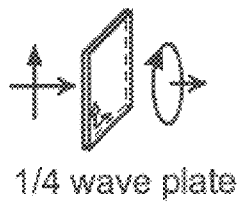
Figure 20C:
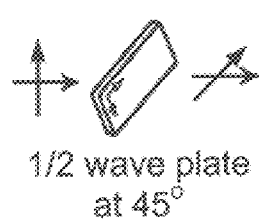
Figure 20D:
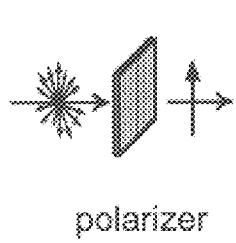
Figure 20E:
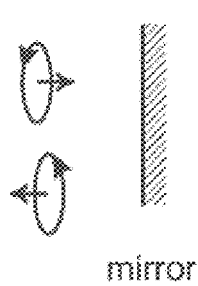
Figure 20F:
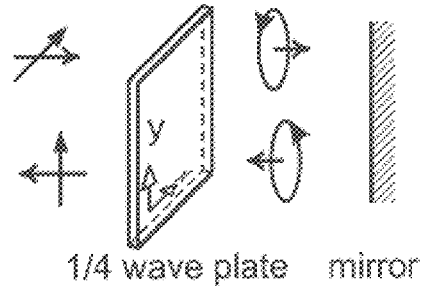

In this case a directed reflector would contain a spectral absorbing light modulating layer placed between the lenslet array and the reflective layer of the retroreflector. There are several alternative spectral absorbers and reflectors that can be utilized by the present invention. For example, dyes which have a fairly narrow absorption spectra, can be selectively mixed to produce light absorbing dye mixture with a specific signature spectrum.
Interference Based Light Modulation:

Interference based mirrors can also be utilized by the present invention to produce a pattern of reflected light. For example, a multi-layer dielectric reflective layer can be designed to have a specific spectral reflectivity curve. This spectral dielectric mirror is then used in place of the conventional reflective layer of the reflectors described hereinabove.
Thick Reflection Holograms:

Suitable holographic materials, such as dichromated gelatin or photopolymers can be employed in producing thick reflection holographic mirror to be used as the reflective layer of the retroreflector of the present invention. One method to prepare the holographic mirror, is to expose both sides of the holographic material to collimated, mutually coherent, laser light of equal intensity and angles of incidence. This exposure can be repeated several time, using different wavelengths and/or exposure angles. The wavelengths and angles utilized in each exposure will dictate the reflection wavelengths of the material, while at all other wavelengths the material would be essentially transparent. This spectral holographic mirror is then used in place of the conventional reflective layer of the reflectors described hereinabove.
Angular Encoding:

When the size of the details of the pattern on the light modulating layer described above is equal to, or larger than, the pitch of the array of lenslets (130 in FIG. 18), each lenslet in the spatially encoded retroreflector returns essentially the same intensity (accounting for normal photometric losses) throughout its entire range of acceptance angles. However, when the pattern on light modulating layer 130 is smaller than the pitch of array 52 of lenslets 54, as is shown in FIGS. 19*a–b*, the retroreflector can return vastly different intensity, or color, in response to different angles of acceptance, thus producing an angularly encoded retroreflector.

According to the present invention, one type of angularly encoded retroreflector uses a periodic pattern on the transparency. Thus, the transmittance function ($\tau t_{\alpha a}$, x, y), of such a directed reflector satisfies the following:

$$\tau_\alpha(x,y) = \tau_\alpha(x - jP_l, y - kP_l) \quad (24)$$

where $P_l$ is the pitch of array 52, and j and k are arbitrary integers (for the coordinates $x-jP_l$ and $y-kP_l$ which remain inside the retroreflector).

This can also be represented by the following:

$$\tau_\alpha(x, y) = \sum_{j=-\frac{X}{2P_l}}^{\frac{X}{2P_l}} \sum_{k=-\frac{Y}{2P_l}}^{\frac{Y}{2P_l}} \tau_{\alpha,0}(x - jP_l, y - kP_l) \quad (25)$$

where X×Y is the size of the entire array, and $$\tau_{\alpha,0}(x, y) \stackrel{def}{=} \begin{cases} \tau_\alpha(x, y) & \text{if } -\frac{P_l}{2} < x \le \frac{P_l}{2} \text{ and } -\frac{P_l}{2} < y \le \frac{P_l}{2} \\ 0 & \text{otherwise} \end{cases} \quad (26)$$

Thus, the intensity of the retroreflected beam $I_R$ which is a function of the angles of incidence $\alpha\, a_x$ and $\alpha\, a_y$ (measured from the normal to the retroreflector surface) can be represented by:

$$I_R(\alpha_x, \alpha_y) = I_{R,0}(\alpha_x, \alpha_y)[\tau_{\alpha,0}(F_l \tan \alpha_x, F_l \tan \alpha_y)] \quad (27)$$

where $I_{R,0}$ is the value of $I_R$ ($\alpha\, a_x$, $\alpha\, a_y$) when light modulating layer 130 is not used, and $F_l$ is the combined effective focal length of lenslets 54 and 58 lo of a cell. The function $\tau t_{\alpha\, a,0}$ is squared because light passes through the transparency twice.

In this directed reflector each illumination angle produces a uniform retroreflected beam. It will be appreciated however, that it is also possible to utilize non-periodic patterns in light modulating layer 130 to thereby produce different retroreflected images when the directed reflector is illuminated from different angles, thus providing a directed reflector that is both angularly and spatially encoded.

It will further be appreciated that this angularly encoded scheme, as well as the spatially encoded scheme presented above, can be combined with the spectrally encoding scheme described hereinabove into a single directed reflector by simply utilizing, for example, suitable dye mixture or non-uniform holograms in the light modulating layer.

Polarization Based Light Modulation:

Reflected light can also encode information via polarization. Since the unaided human eye cannot differentiate between polarized and non-polarized light (as well as between different modes of polarization), retroreflectors which encode information via specific modes of polarization can be utilized as highly secure identifier tags.

FIGS. 20a–f illustrate prior art polarizers and wave-plates which can be utilized by the retroreflector of the present invention to polarize reflected light. Detailed information on the theory of light polarization and on practical methods for manipulating polarized light is described in numerous textbooks and articles, for example, see reference [7].

Polarized light can be described as a combination of either two linear, or two circular polarization modes. Wave plates can convert light between these modes, as shown by FIGS. 20a–c and 20f. When linearly polarized light hits a mirror perpendicularly, its polarization state is preserved. However, circularly polarized light switches its circular polarization state when reflected from a metallic mirror. The combination of a ¼ wave plate (FIG. 20b) and a mirror will therefore switch the state of a linearly polarized light. Methods for preparing transparencies that modulate the polarization, rather than the intensity of light have been previously described, see, for example, reference [2]. At present, both waveplates and polarizing beam splitters can be fabricated via thin layer coating which can be utilized as a light modulating layer of the retroreflector of the present invention.

Figure 21:
FIG. 21 is a cross sectional view of two adjacent cells of a retroreflector provided with a light modulating layer capable of changing the polarization state of reflected light according to the teachings of the present invention.
Figure 21:
Figure 21:
Figure 21:
Figure 21:
Figure 21:
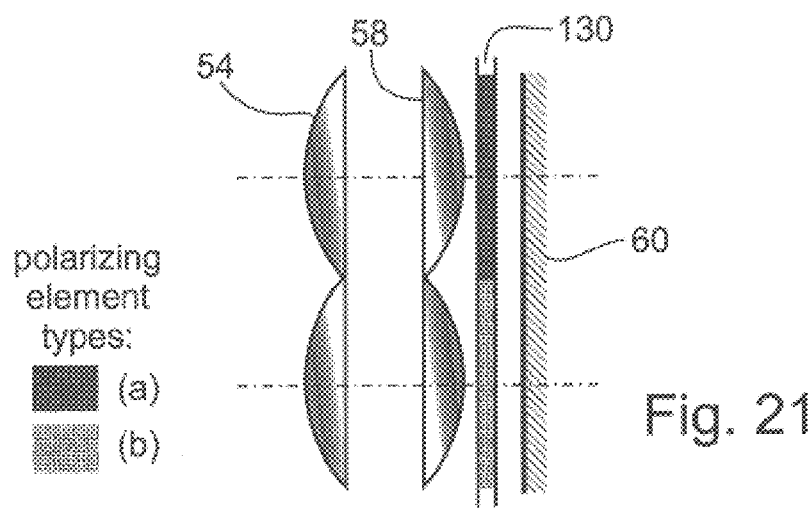

As is specifically shown in FIG. 21, the retroreflector of the present invention can utilize a polarization transparency light modulating layer 130 to modify the polarization state of the reflected light. For example, this transparency can be divided into pixels, each having the size of a single reflector lenslet, and each having different polarization properties. Typically, the entire-area of the transparency, which corresponds to the size of the array of lenslets, is covered with two types of polarization elements.

The retroreflector according to the present invention can utilize polarizers including for example, vertical and horizontal polarizing regions such that when the retroreflector is illuminated with unpolarized light and viewed through a vertical polarizer, a light pattern is obtained.

Alternatively the retroreflector of the present invention can utilize wave plates including for example ¼ wave plate and clear regions such that when illuminated with vertical linearly polarized light and viewed through horizontal polarizer, a light pattern is obtained.

Other polarizing schemes can also be utilized by the retroreflector of the present invention to modify the polarization of the reflected light, so as to produce patterns of varied intensity. In any case, it is possible to have the pattern, or image, produced by the reflected light visible only through special viewing devices and/or the use of dedicated illumination schemes.

In addition, spatial light modulators can also be utilized to modulate the polarization mode of the reflected light (typically acting as a variable wave plate), allowing the option of dynamic (programmable) polarization encoded retroreflectors.

Smart Active Encoding:

As is further described in Example 5 below, the retroreflector of the present invention can also be utilized in a smart active encoding system. For example, the retroreflector shown in FIG. 17 can be provided with a light detector including amplifying circuits and control/processing electronics.

The unique advantages provided by the retroreflectors and the directed reflectors described hereinabove can be utilized for a variety of applications. The following Examples describe several such applications, it will be appreciated however, that numerous additional applications can be realized by utilizing the reflectors of the present invention.

Example 3

Markings

Road Markings:

Retroreflectors are already used in several types of road markings, including traffic signs and lane marking. There are several advantages to using the reflectors of the present invention in road markings.

Since vehicle headlights are typically located lower than the driver's line of sight, retroreflectors are not the optimal solution for sign visibility, particularly for tall vehicles such as trucks. Signs that address truck drivers can benefit from non-retroreflecting directed reflectors, designed for the correct height difference and viewing distance. Directed reflectors can be designed such that a portion of the incident light is retroreflected, while the rest is reflected in an angle different than zero with respect to the incident light.

As already mentioned hereinabove the directed reflectors of the present invention can be designed to produce a flickering reflected light. Flickering light is currently utilized for turn and "hazard" signals in cars, for police, fire and paramedic cars, and other instances. However, all these applications involve the use of light sources, which consume significant amount of power and thus are not readily suitable for long term unattended road use. The directed reflector of the present invention can be utilized to generate flickering hazard light with little or no power consumption.

Such reflectors can be incorporated into road signs, lane separator markings and the like.

The directed reflectors described herein can also be utilized to switch signs, or areas in signs, on and off as needed. Unlike signs made by plurality of light sources (LEDs, incandescent bulbs, neon, etc.), the power requirement of such modulated retroreflectors is very low. Thus, signs using modulated retroreflectors need not to be wired to the power grid, can be controlled by radio, without a need for a large power source or frequent servicing; in fact, for many cases photovoltaic cells would suffice to keep the batteries charged. Such signs can be turned on and off, or can be divided into pixels as small as a single retroreflector cell, each individually switchable, to allow programmable graphics and text display.

Airfield Marking:

Airfield markings and other aircraft related signs have requirements somewhat similar to those of road signs. For example, flickering reflectors can be used as landing lights on isolated landing strips, or as warning lights on tall buildings, towers, and bridges, as well as on high voltage power lines.

In addition the retroreflectors according to the present invention can be utilized to display different images when viewed from different directions. For example, airstrip markers can display arrows for correcting a landing approach direction, which arrows would change according to the direction from which they are viewed.

Retroreflectors can also be utilized for formation flying particularly with helicopters, by being positioned on the extremities of each aircraft. In this case reflection is only provided when the aircraft are aligned; furthermore, by using wavelength selectivity, such retroreflectors can be made, for example, visible only with proper infra-red goggles, so pilots can see each other at night, but not be readily seen from the ground.

Example 4

Position and Motion Detection and Measurement

Since retroreflectors can be easily detected, they can be used to mark a position of an object at a given time. Several types of motion can be detected and measured via prior art retroreflectors. For example, transverse linear motion (perpendicular to the line of sight) can be detected as simple motion of the image of the retroreflector, as formed by a lens on an imaging device (such as a CCD-imager) or a position detector. Longitudinal motion (along the line of sight) can be measured using the Doppler effect by measuring the shift in the wavelength of the light itself, possibly through interference, or by modulating the illuminating source and measuring the shift in the modulation frequency.

The use of the retroreflectors of the present invention enables to refine retroreflector based motion detection systems. For example, rotation of objects carrying a retroreflector can be detected if the retroreflector is angularly encoded as described hereinabove. The use of the encoded retroreflectors of the present invention can significantly decrease error since encoding of reflected light enables to discriminate between true retroreflected beams and background noise resultant from other reflective surfaces. The use of encoding also enables to monitor motion of several objects simultaneously by marking each object with a different retroreflected code.

Figure 23:
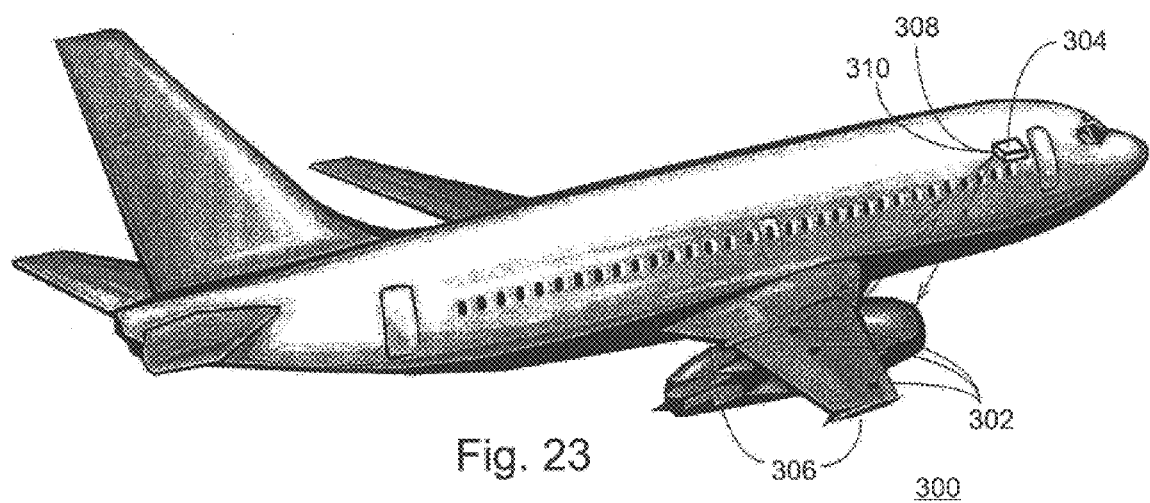
FIG. 23 is a perspective view of an aircraft provided with a movement monitoring system for monitoring wing movement, according to the teachings of the present invention.

One example of a movement monitoring system for monitoring a movement of an object is illustrated in FIG. 23. A system 300 according to this aspect of the present invention includes at least one wide angle directed reflector 302 (four are shown in FIG. 23) which is mountable on an object such as, for example, an aircraft wing 306. Wide angle directed reflector 302 includes all the features described hereinabove with respect thereto. The system according to this aspect of the present invention further includes an optical sensing device 304 which includes (i) a light source 308 for illuminating wide angle directed reflector(s) 302; and (ii) a detector 310 for receiving light reflected from directed reflector(s) 302. Detector 310 serves for monitoring changes in a position of at least one diffraction lobe of the light, so as to monitor a movement of wing 306. Wide angle directed reflector 302 preferably further includes a light modulating layer disposed relative to the lenticular layer and the reflective layer. The light modulating layer serves for modulating light passing through and reflected from the light modulating wide angle directed reflector such that background light resultant from glints and reflections not associated with wide angle directed reflector 302 and therefore not modulated, is not monitored by detector 310.

Example 5

Identification Systems

Passive Identification Systems:

The retroreflectors of the present invention can also be utilized in identification and security systems.

Since light received by a retroreflector is not scattered, but is retroreflected towards the source and since it uses common and safe light at reasonably low intensity, such identification systems can be energy efficient, secure and devoid of health hazards associated with radiating systems.

In addition, since reflectors are inherently multidimensional, a single retroreflector can encode data spatially, angularly, spectrally and in polarization. Furthermore, an active (modulated) retroreflector utilizing minimal amounts of power can also encode data temporally. Thus, the amount of information reflectors can convey, and the effective data rate, can be very large.

For example, a multiply encoded identification card provided with a 5×5 cm retroreflector area, a lenslet pitch of 0.5 mm, an internal light modulating layer with a resolution of 10 $\mu$mm, and a spectral mirror with wavelength resolution of 50 nm over the visible band, will supply 10,000 pixels of information, each supporting 2,500 angular channels and 6 wavelength bands, for a total of $1.5 \times 10^8$ bits (approximately 18 Mbytes) of information. Assuming illumination with a 20 microsec long pulse from a strobe light, a peak data rate of $7.5 \times 10^{12}$ bits/sec (7.5 Terabits per second) can be achieved.

Retroreflection based identification/security systems can be used in a variety of environments and applications including vehicle access control, pedestrian access control, warehouse stock monitoring, personnel locating, authorization access, cargo monitoring and the like. Retroreflectors can be incorporated into identification cards, adhesive stickers, and packaging.

Retroreflective identification system can operate with light in the visible spectrum, and light outside the visible spectrum, such as infra-red light.

The following sections describe in more detail the use of reflectors in identification systems.

Spatial Encoding:

A retroreflector designed as a pattern such as, for example, a bar code, accompanied, if necessary, by readable text and/or graphics, can be easily identified by a computer. A video camera with a light source can easily differentiate between the retroreflector and the background. For example, it can compare images acquired with the light on and off. For moving objects, fast strobe illumination can help eliminate any artifacts that may result from motion. Decoding the pattern can be performed using standard image processing algorithms and/or procedures.

Figure 22:
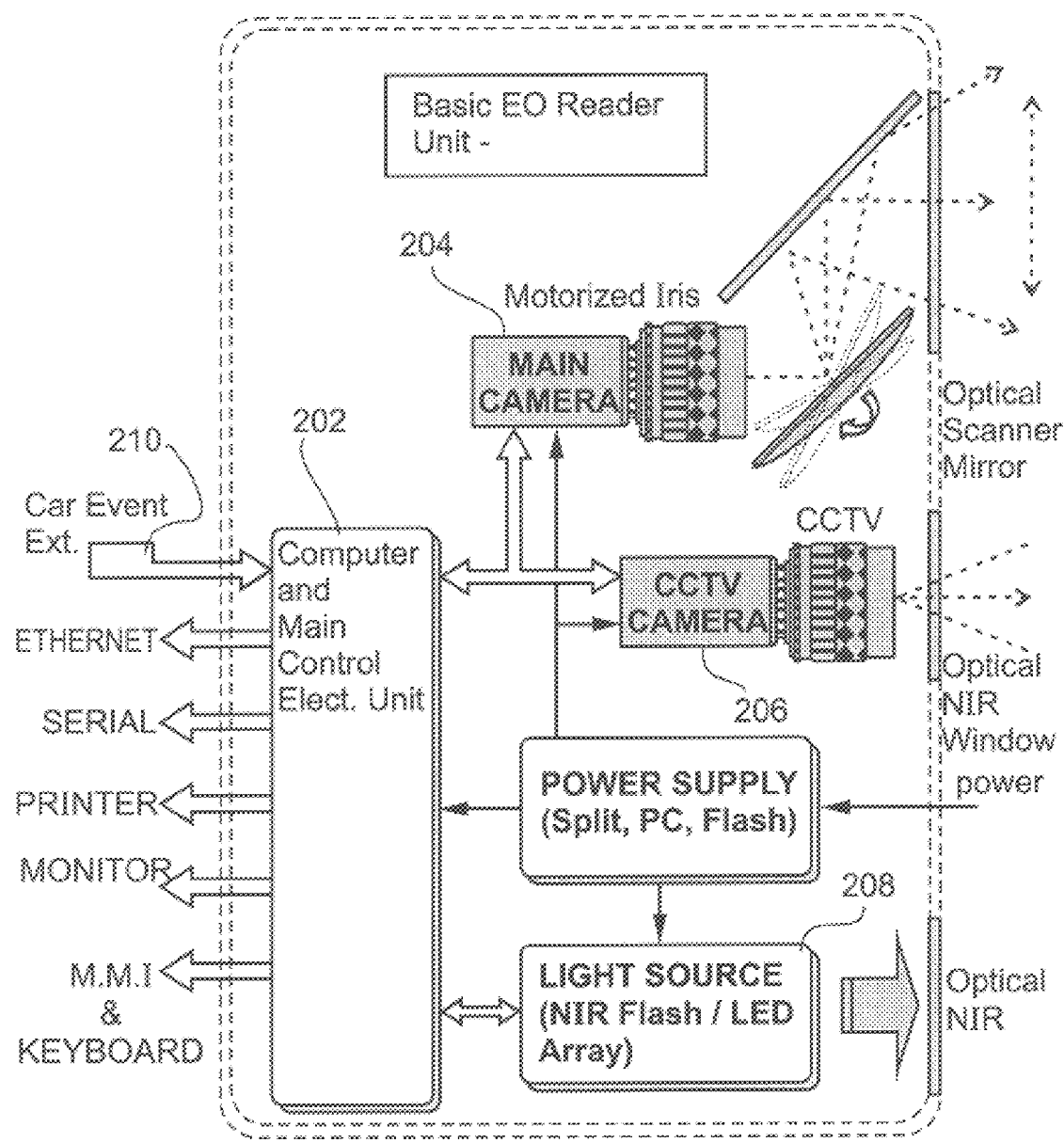
FIG. 22 is a black box diagram of an identification readout unit for spatially encoded retroreflective tags according to the present invention.

An example of a readout unit for spatially encoded retroreflective cards or stickers is presented in FIG. 22. Basically, the unit comprises a small computer 202, two cameras 204 and 206 (such as CCD or CMOS), image frame grab circuitry, a light source 208 and interfaces to external units.

This unit can be used, for example, for vehicle access control. When a vehicle arrives at an access point, such as a gate, it activates sensors, such as a metal detector provided in or on the road, or an optical detector. This sensor sends a signal to a computer (as indicated by 210), which activates the light source 208 and camera 206. A wide field image is acquired, digitized and transmitted to the memory of computer 202.

Because the retroreflector (with the code) provided on the vehicle reflects the light back towards the source, it will be relatively bright in the image. This will enable the computer software to locate the retroreflector in the digitized image.

Computer 202 will then send an appropriate signal to the scanning mirror, such that it will direct light from the retroreflector to camera 204. This camera is equipped with a longer focal length lens, enabling a higher magnification but a narrower field of view than camera 206. Light source 208 will be reactivated, and a higher resolution image of the code bearing retroreflector will be acquired, digitized and transmitted to computer 202. Image processing software operated by computer 202 will interpret the reflected code, to determine if access is authorized or not. The computer may then send an appropriate signal to control, for example, an entrance gate.

It will be appreciated that in cases where the distance of an angularly encoded retroreflective tag is known, a set of light source/detector units can be used to verify that light is reflected to a predetermined direction.

Active Identification Systems:

Identification systems incorporating active reflectors are more complex since active reflectors must also include a light modulator (e.g., a liquid crystal layer, or a LCD array), a control chip or ASIC circuit, a light detector (such as a photodiode) and a control program. Although an active directed reflector is bulkier than a passive directed reflector it is still small enough to be included in, for example, a credit card sized identification device.

Figure 24:
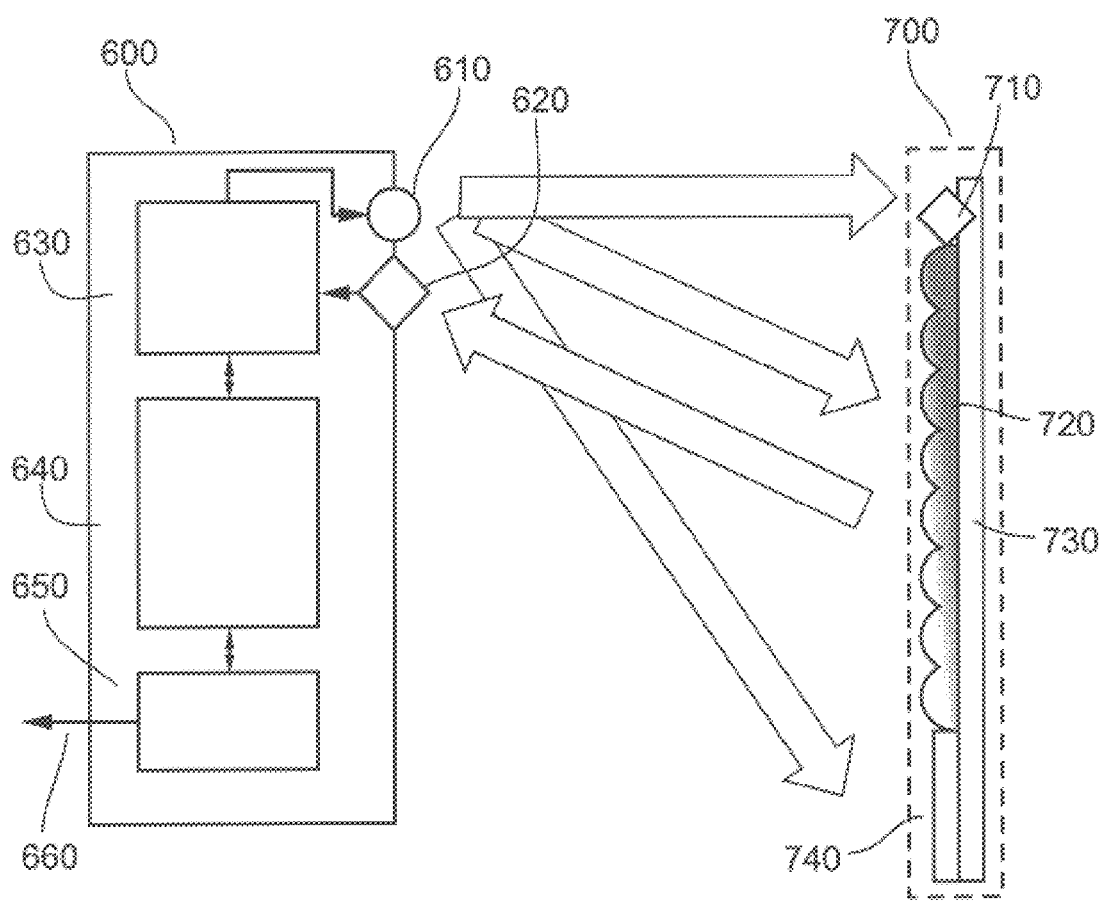
FIG. 24 is a schematic diagram showing the overall structure of an "optical smart card" according to the present invention and its control unit.

FIG. 24 illustrates an optical smart card 700 and an associated control unit 600 according to the teachings of the present invention. For the purpose of clarity, only the key components are shown. The control unit includes a computer 640 (which may be a single chip microcomputer, several electronic chips on some printed circuits, or several printed circuits together with peripherals such as computer disk(s), keyboard, screen, etc.), a light emitter 610 (e.g., an LED or several LED's) a detector 620 (typically a silicon photodiode), driver and interface circuits sub-unit 630 (typically containing amplifiers, a comparator, an analog to digital converter and impedance matching components), and an input/output sub-unit 650 allowing unit 600 to communicate (probably via cable or wires 660) with an external system. Optical smart card 700, includes a retroreflector (or directed reflector) 720 which is capable of electronically controlling the retroreflection modulation efficiency, by for example, varying the distance between the lenslet and the reflector arrays. Optical smart card 700 also includes a light detector 710, a processing unit 720 (preferably of the single chip type), and a power unit 740 (possibly containing photovoltaic cells and a rechargeable battery).

Figure 25:
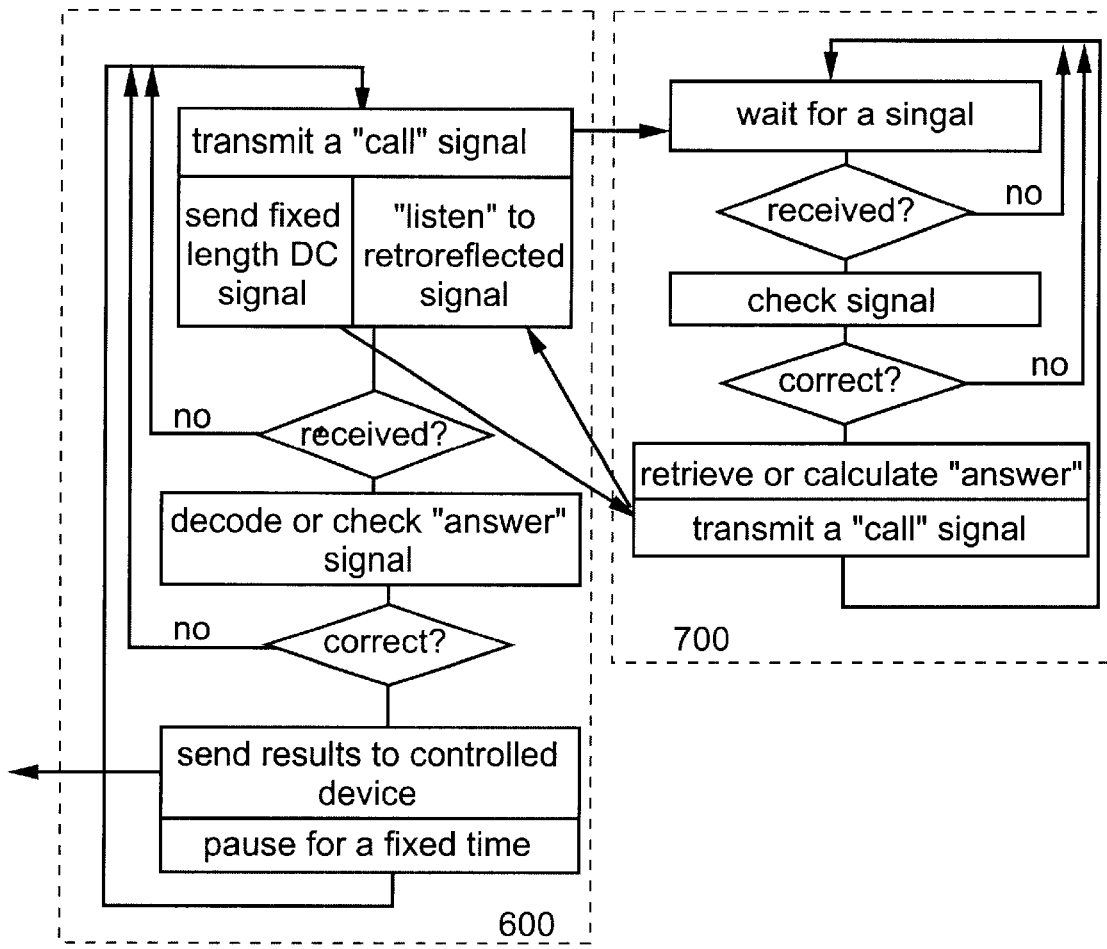
FIG. 25 are flow diagrams illustrating the function of the "optical smart card" and its control unit according to the teachings of the present invention.

FIG. 25 is a flow diagram which illustrates the operation of optical smart card 700 and unit 600.

Communication initiates with transmittance of a signal containing a code, as indicated by 750. As indicated by 752, this signal is detected by detector 710 of optical smart card 700 and verified, as indicated by 754. Verification can be effected, for example, by comparing the received signal to a list of signals stored in optical smart card 700, or by applying a mathematical rule (for example, calculation of residue when dividing by certain prime number or numbers). Following transmittance of the signal, control unit 700 sends an unmodulated (CW) or a constant intensity (DC) signal for a predetermined amount of time, as indicated by 756. Optical smart card 700 modulates the CW or DC signal and generates a reflected signal, as indicated by 758. Since optical smart card 700 includes a modulator rather than a light emitter, very little energy is required for generating the return signal. In addition, since optical smart card 700 employs a retroreflector most of the modulated light is reflected back to the detector in the control unit 600, thus, maximizing light efficiency and minimizing the possibility of electronic or optical eavesdropping.

It will be appreciated that the communication cycle described above may suffice for identification purposes, for other applications, some of which are described hereinbelow, more complex communication schemes utilizing multiple communication cycles or more complex communication protocol may be necessary.

It will further be appreciated that the CW signal refereed to hereinabove can be replaced by a signal containing one or more temporal frequencies, thus enhancing the distinction between modulated retroreflected light and ambient background signals.

The level of security obtainable by such a system depends on the complexity of the signals communicated between unit 600 and card 700. Possible communication protocols can include, but are not limited to, (i) fixed inspection signal pattern and a fixed retroreflector reply; (ii) a pre-recorded "library" of inspection signals, each having one correct reply; (iii) arbitrary inspection signals replied with identical retroreflector signals (possibly together with extra information); (iv) encrypted inspection and reply signals, possibly using public key code, wherein unit 600 includes the decryption key, and card 700 the encryption key.

It will be appreciated that unlike signals transmitted by radio frequency, the retroreflected reply signal described above is transmitted in the direction of unit 600 only, and as such, this signal cannot be easily intercepted by a remote third party.

Example 6

Communication Device

The above described identification system can also be used to communicate with a card mounted microcomputer device.

For example, communication between control unit 600 and card 700 can be utilized to read data stored in a flash memory of processing unit 720, feed it to a computer connected to control unit 600, which computer can communicate a return command through control unit 600 for modifying the flash memory of processing unit 720. An encryption protocol will allow processing unit 720 and computer 640 to authenticate the source of the data communicated.

Such reflector based communication can be utilized by smart cards or "electronic wallets" in order to communicate with, for example, a card reader without necessitating physical contact between the card and reader.

Example 7

Figure 26:
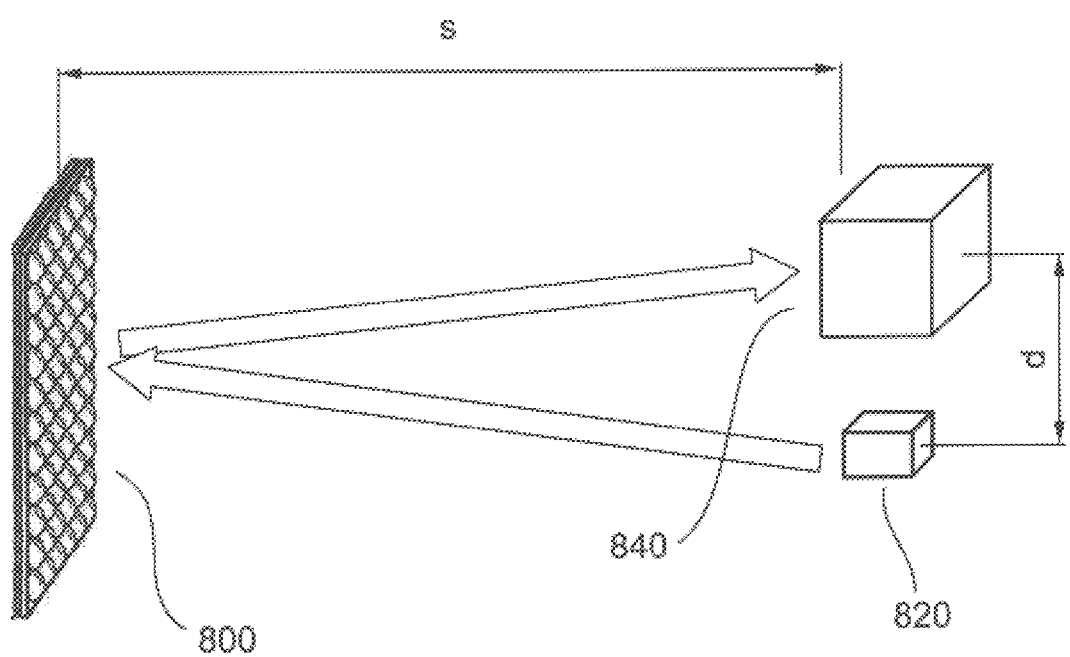
FIG. 26 illustrates a remote identification system according to the teachings of the present invention which includes identification and anti-counterfeiting measures.

Use of a Non-retroreflecting Directed Reflector in an Identification Application FIG. 26 illustrates another retroreflector based identification system according to then teachings of the present invention which system includes an identification card 800 a light source 820 and a detector 840.

This identification system depends upon the non-retroreflective property of the directed reflector utilized by the card. Provided that the directed reflector of card 800 reflects at a constant angle, $\Delta\alpha$, (where $\Delta\alpha \approx d/s$) and that s>>d, a light signal originating from light source 820 will be directed by card 800 towards detector 840.

Cards which employ a reflector (retro or directed) which does not satisfy $\Delta\alpha$, or a card 800 which is utilized from a distance which does not satisfy s>>d, will produce little or no reflected light.

This identification system can be utilized for identification purposes or as an extra anti-counterfeit measure, in for example, credit cards.

In addition, the use of a directed reflector enables to simplify the construction of a detection system since in such a case light source 820, and detector 840 need not be in close proximity to each other.

Example 8

Methods of Manufacturing

The directed reflectors described hereinabove can be fabricated from various plastic materials, using mass production techniques. A first step in a fabrication process is the design and production of a master unit and molds, which can be effected, for example, via lithographic technologies, such as those developed by the laboratory of Non Conventional Optics at the Jerusalem College of Technology, Israel and elsewhere (see, for example, references [61] and [62]). The next step involves the replication of the master units using electroplating nickel shims or sub-masters and combining different or identical shims into larger shims. This step can also be achieved via hot-stamper-embossing, UV-embossing or high volume production by roller embossing and injection molding.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications cited herein are incorporated by reference in their entirety. Citation or identification of any reference in this application shall not be construed as an admission that such reference is available as prior art to the present invention.

LIST OF REFERENCES

[1] G. Lippmann, "Epreuves reversible, Photographies intgrales," Comp. Rend. 146, 446–451 (1908).

[2] Edwin H. Land, "Vectographs: Images in terms of vectorial inequality and their application in three-dimensional representations," J. Opt. Soc. Am. 30, 230 (1940).

[3] Y. N. Denisyuk, Soviet Phys.-Dokl. 7, 543 (1963).

[4] Reinhard Beer and Darwin Majaniemi, "Wavefronts and construction tolerances for a cat's-eye retroreflector," Appl. Opt. 5, 1191 (1966).

[5] J. W. Goodman, *Introduction to Fourier Optics*, section 6-3, pps.117–120 (McGraw-Hill, San Francisco, 1968).

[6] Gerald F. Marshall and M. H. Williams, "Retroreflective photometry for screen efficiency evaluation," Appl. Opt. 9, 2134 (1970).

[7] M. V. Klein, Optics, Chapter 10, pps. 483–520 (John Wiley and Sons, New York, 1970).

[8] N. H. Farhat, and H. M. Weiskittel, "Determination of the velocity vector of point retroreflectors by spatial filtering of Doppler spectra," Appl. Opt. 10, 868 (1971).

[9] W. K. Bingham, "Retroreflective microspheres having a dielectric mirror on a portion of their surface and retroreflective construction containing such microspheres," U.S. Pat. No. 3,700,305 (Oct. 21, 1972).

[10] C. V. Sevelin and P. V. Palmquist, "Retroreflective film," U.S. Pat. No. 3,801,183 (Apr. 2, 1974).

[11] J. J. Snyder, "Paraxial ray analysis of a cat's-eye retroreflector," Appl. Opt. 14, 1825 (1975).

[12] Richard F. Lutomirski and Russell E. Warren, "Atmospheric distortions in a retroreflected laser signal," Appl. Opt. 14, 840 (1975).

[13] J. J. Snyder, "Paraxial ray analysis of a cat's-eye retroreflector: reply to comments," Appl. Opt. 15, 1691 (1976).

[14] W. G. Egan and T. Hilgeman, "Retroreflectance measurements of photometric standards and coatings," Appl. Opt. 15, 1845 (1976).

[15] Reinhard Beer, "Paraxial ray analysis of a cat's-eye retroreflector: comments," Appl. Opt. 15, 856 (1976).

[16] G. Adrian Horridge, "The compound eye of insects," Scientific American, 108–121 (July 1977).

[17] J. E. Cook and T. R. Bailey, "Reflective sheet material," U.S. Pat. No. 4,099,838 (Jul. 11, 1978).

[18] M. D. Stoudt and K. Vedam, "Retroreflection from spherical glass beads in highway pavement markings. : Specular reflection," Appl. Opt. 17, 1855 (1978).

[19] K. Vedam and M. D. Stoudt, "Retroreflection from spherical glass beads in highway pavement markings. 2: Diffuse reflection (a first approximation calculation)," Appl. Opt. 17, 1859 (1978).

[20] M. Camac and F. Bien, "Motion detection and measurement," U.S. Pat. No. 4,086,808 (May 2, 1978).

[21] F. Weindling, "Optical retroreflector," Appl. Opt. {/bf 17}, a161 (1978).

[22] Harrison H. Barrett and Stephen F. Jacobs, "Retroreflective arrays as approximate phase conjugators," Opt. Lett. 4, 190 (1979).

[23] William H. Venable Jr., H. F. Stephenson and Heinz Terstiege, "Factors affecting the metrology of retroreflecting materials," Appl. Opt. 19, 1242 (1980).

[24] Norbert L. Johnson and H. F. Stephenson, "Influence of aperture size on the photometry of retroreflectors," Appl. Opt. 19, 1247 (1980).

[25] Kenneth L. Eckerle, Jack J. Hsia, Victor R. Weidner and William H. Venable, Jr. "NBS reference retroreflectometer," Appl. Opt. 19, 1253 (1980).

[26] J. J. Rennilson, "Chromaticity measurements of retroreflective material under nighttime geometry," Appl. Opt. 19, 1260 (1980).

[27] Pierre Mathieu and Pierre-Andre Belanger, "Retroreflective array as resonator mirror," Appl. Opt. 19, 2262 (1980).

[28] C. A. Berg "Oscillating retroreflector," U.S. Pat. No. 4,307,939 (Dec. 29, 1981).

[29] R. A. Frosch, "Modified Michelson interferometer using beam reversing retroreflections and wedged compensator plates," U.S. Pat. No 4,278,351 (Jul. 14, 1981).

[30] Frank Cooke, "Making masters for corner cube reflectors," Appl. Opt. 20, A80 and 1267–1268 (1981).

[31] "Photometry and colorimetry of retroreflection: state-of-measurement-accuracy report by NBS," Appl. Opt. 20, 1266 (1981).

[32] Alan E. Craig and Dror Sarid, "Performance of a retroreflecting, hemispherical waveguide coupler," OSA Annual meeting (Ocrober 1993), summary in J. Opt. Soc. Am. 73}, 1912 (1983).

[33] D. B. Neumann, "Scanning beam reference employing a retroreflective code means," U.S. Pat. No. 4,447,723 (May 8, 1984).

[34] D. A. Palmer, "Retroreflective materials and optical imaging," Appl. Opt. 24, 1413 (1985).

[35] J. Rennilson, "Retroreflection: what is it and how is it used?" ASTM Standardization News (February 1987).

[36] C. B. Layne, "Gradient index retroreflector," U.S. Pat. No. 4,789,219 (Dec. 6, 1988).

[37] G. Gould, W. H. Culver, "Retroreflective optical communication system," U.S. Pat. No. 4,777,660 (Oct. 11, 1988).

[38] J.C. Nelson and S. Cobb, "High efficiency retroreflective material," Appl. Opt. 29, 2348 (1990). U.S. Pat. No. 4,895,428 (Jan. 23, 1990).

[39] Zvi Weinberger, U.S. Pat. No. 4,958,065 (Sep. 18, 1999).

[40] C. G. Kuney, "Microsphere-based retroreflective articles with enhanced retroreflective brightness," U.S. Pat. No. 4,957,335 (Sep. 18, 1990).

[41] Shojiro Nemoto and Jun Kida, "Retroreflector using gradient-index rods," Appl. Opt. 30, 815 (1991).

[42] L. E. Faykish and W. K. Bingham, "Retroreflective security laminates-with protective cover sheet," U.S. Pat. No. 5,080,453 (Jan. 14, 1992).

[43] L. E. Faykish, D. K. Fossum and W. K. Bingham, "Retroreflective security laminate with dual level verification," U.S. Pat. No. 5,169,707 (Dec. 8, 1992).

[44] Ping Kuo Weng and Jin-Shown Shie, "Self-directioning with revolving retroreflection technique," Appl. Opt. 31, 4365 (1992).

[45] Thomas W. Dey, "Monitoring alignment using a modified retroreflector" Appl. Opt. 32, 1043 (1993).

[46] Hirohisa Takada, "Card having retroreflective bar codes and a magnetic stripe," U.S. Pat. No. 5,237,164 (Aug. 17, 1993).

[47] Tsing Dschen, "Method and a device for changing the optical characteristics of a display field on a crarrier," U.S. Pat. No. 5,376,781 (Dec. 27, 1994).

[48] M. T. Gale, M. Rossi, J. Pedersen and H. Sch?tz, "Fabrication of continuous relief micro-optical elements by direct laser writing in photoresist," Opt. Eng. 33(11), 3556–3566 (November 1994).

[49] M. B. Stern and T. Jay, "Dry etching for coherent refractive microlens arrays, " Opt. Eng. 33(11), 3547–3551 (November 1994).

[50] P. O. Minot, "Laser retroreflector array having cat-eye retroreflectors, " U.S. Pat. No. 5,357,371 (Oct. 18, 1994).

[51] James E. Stewart, "Approximate phase conjugation with a retroreflecting array in microscopy," Appl. Opt. 33, 6651 (1994).

[52] *Standard Test Method for Coefficient of Retroreflection of Retroreflective Sheeting*, Designation E 810–94 (American Society for Testing and Materials, West Conshohocken Pa. USA, 1994).

[53] B. Metlitsky and J. Swartz, "Laser diode scanner with enhanced visibility at an aiming distance relative to the reading distance," U.S. Pat. No. 5,304,788 (Apr. 19, 1999).

[54] *Standard Specification for Retroreflective Sheeting for Traffic Control*, Designation E 4956–95 (American Society for Testing and Materials, West Conshohocken Pa. USA, 1995).

[55] Sugaya, Hong Fu, T. Goodman, J. K. Erwin, M. Mansuripur and S. Sugaya, "Retroreflecting ellipsometer for measuring the birefringence of optical disk substrates," Appl. Opt. 34, 31 (1995).

[56] T. C. d'Isepo, D. C. Lai and D, L. Stiver, "Passive identification of friend vs. foe apparatus and method," U.S. Pat. No. 5,583,507 (Dec. 10, 1996).

[57] Hans Peter Herzig, *Micro-Optics: Elements, Systems and Applications*, (Taylor and Francis, London, 1997).

[58] *Nanopositioning* 1998, "Fundamentals of Piezoelectricity and Piezo Actuators," pp. 4.15–4.45 (Physik Instrumente, Waldbronn Germany, 1998).

[59] Kannan Krishnaswami and Michael Tilleman "Off the line-of-sight laser radar," Appl. Opt. 37, 565 (1998).

[60] George H. seward and Pamela S. Cort, "Measurement and characterization of angular reflectamce for cube-corners and microspheres," Opt. Eng. 38, 164–169 (1999).

[61] Nicholas F. Borrelli, *Microoptics Technology: Fabrication and Applications of Lens Arrays and Devices*, (Marcel Dekker Inc., Basel, 1999).

[62] Stefan Sinzinger and J?rgen Jahns, *Microoptics*, (Wiley-VCH, Weinhem Germany, 1999).

[63] R. Kingslake, *Optical System Design*, section 6.II.B, pp. 88–89 (Academic Press, New York, 1983).

What is claimed is:

1. A wide angle directed reflector comprising:
   (a) a lenticular layer including at least one array of lenslets, each of said lenslets having a focal length; and
   (b) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence, said substantially constant angle being substantially greater than zero, thereby rendering the directed reflector a non-retroreflector.

2. The wide angled directed reflector of claim 1, wherein each of said lenslets functions as a rear telecentric lenslet.

3. The wide angle directed reflector of claim 1, wherein said angle of incidence on said lenticular layer ranges at least +/− 20 degrees from a normal angle of incidence.

4. The wide angle directed reflector of claim 1, wherein said reflective layer includes an array of concave corrugated reflective elements.

5. The wide angle directed reflector of claim 1, wherein each of said lenslets has a diameter less than about 1 mm.

6. The wide angle directed reflector of claim 1, wherein each of said lenslets has a diameter less than about 0.5 mm.

7. The wide angle directed reflector of claim 1, wherein each of said lenslets has a diameter less than about 0.1 mm.

8. The wide angle directed reflector of claim 1, wherein each of said lenslets of said lenticular layer is selected from the group consisting of a diffractive lenslet, a refractive lenslet, and a combination diffractive-refractive lenslet.

9. The wide angle directed reflector of claim 1, wherein said reflective layer is a corrugated planar reflector.

10. A wide angle directed reflector comprising:
   (a) a lenticular layer including at least one array of lenslets, each of said lenslets having a focal length; and
   (b) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence and wherein said reflective layer includes an array of concave reflective elements.

11. The wide angle directed reflector of claim 10, wherein said substantially constant angle is substantially zero and therefore the directed reflector is a retroreflector.

12. The wide angle directed reflector of claim 10, wherein said substantially constant angle is substantially greater than zero and therefore the directed reflector is a non-retroreflector.

13. The wide angle directed reflector of claim 10, wherein lenslets of said at least one array of lenslets and said concave reflective elements of said array of concave reflective elements are optically co-aligned.

14. The wide angle directed reflector of claim 10, wherein a distance between a lenslet of said lenslets and a respective concave reflective element of said concave reflective elements is selected such that a center of said concave reflective element is located at a focal plane of said lenslet.

15. The wide angle directed reflector of claim 14, wherein said lenticular layer and said reflective layer are integrated into a single layer.

16. A wide angle directed reflector comprising:
   (a) a lenticular layer including at least one array of lenslets, each of said lenslets having a focal length; and
   (b) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence and, wherein each of said lenslets of said lenticular layer includes a convex face and an opposing flat face.

17. A wide angle directed reflector comprising:
   (a) a lenticular layer including at least one array of lenslets, each of said lenslets having a focal length; and
   (b) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence and wherein said lenticular layer and said reflective layer are integrated into a single layer.

18. A wide angle directed reflector comprising:
   (a) a lenticular layer including at least one array of lenslets, each of said lenslets having a focal length; and
   (b) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence and wherein each lenslet of said array of lenslets includes a pair of opposing convex faces.

19. A wide angle directed reflector comprising:
   (a) a lenticular layer including at least one array of lenslets, each of said lenslets having a focal length; and
   (b) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence and wherein said lenticular layer includes an external array of lenslets and an internal array of lenslets.

20. The wide angle directed reflector of claim 19, wherein each lenslet of each of said external array of lenslets and said internal array of lenslets includes a convex face and a planar opposing face.

21. The wide angle directed reflector of claim 20, wherein respective lenslets of said external array of lenslets and said internal array of lenslets form lenslet pairs such that said planar opposing faces thereof face one another.

22. The wide angle directed reflector of claim 21, wherein said reflective layer is planar.

23. The wide angle directed reflector of claim 22, wherein for each of said lenslet pairs, incident light passing through an aperture of a lenslet of said external array of lenslets and then through a respective internal lenslet of said internal array of lenslets is rendered normal to said reflective layer.

24. A wide angle controllable directed reflector comprising:
   (a) a lenticular layer including at least one array of lenslets, each of said lenslets having a focal length;
   (b) a reflective layer being disposable relative to said lenticular layer, said lenticular layer and said reflective layer being constructed and designed such that, for a given relative orientation of said lenticular layer and said reflective layer, light incident at an angle of incidence on said lenticular layer is reflected by said reflective layer and redirected through said lenticular layer at a substantially constant angle relative to said angle of incidence; and
   (c) a directed reflection controlling mechanism being designed and constructed to controllably alter said given relative orientation of, or distance between, said lenticular layer and said reflective layer, such that light incident at said angle of incidence on said lenticular layer is reflected by said reflective layer and redirected through said lenticular layer at an angle different than said substantially constant angle relative to said angle of incidence.

25. The wide angle controllable directed reflector of claim 24, wherein said directed reflection controlling mechanism is designed and constructed to reciprocally alter said given relative orientation of, or said distance between, said lenticular layer and said reflective layer.

26. The wide angle controllable directed reflector of claim 24, wherein said angle of incidence on said lenticular layer ranges at least +/− 20 degrees from a normal angle of incidence.

27. A light modulating wide angle directed reflector comprising:
(a) a lenticular layer including at least one array of lenslets, each of said lenslets having a focal length;
(b) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence; and
(c) a light modulating layer being disposed relative to said lenticular layer and said reflective layer, said light modulating layer being for modulating light passing through and reflected from the light modulating wide angle directed reflector.

28. The light modulating wide angle directed reflector of claim 27, wherein said modulating layer is disposed between said lenticular layer and said reflective layer.

29. The light modulating wide angle directed reflector of claim 27, wherein said modulating layer forms a part of said reflective layer.

30. The light modulating wide angle directed reflector of claim 27, wherein said angle of incidence on said lenticular layer ranges at least +/− 20 degrees from a normal angle of incidence.

31. The light modulating wide angle directed reflector of claim 27, wherein said light modulating layer and said reflective layer are integrated into a single reflective and light modulating layer.

32. The light modulating wide angle directed reflector of claim 27, wherein said light modulating layer is selected from the group consisting of a light polarizing layer, a polarization fractional-wave retardation plate, an optical filter, and a patterned layer having substantially opaque regions and substantially transparent regions.

33. The light modulating wide angle directed reflector of claim 27, wherein said light modulating layer is disposed between said lenticular layer and said reflective layer.

34. The light modulating wide angle directed reflector of claim 27, wherein said light modulating layer is disposed in front of said lenticular layer.

35. The light modulating wide angle directed reflector of claim 27, wherein said light modulating layer includes a fluid.

36. The light modulating wide angle directed reflector of claim 32, wherein said patterned layer is a code identifying an object with which the light modulating wide angle directed reflector is associatable.

37. The light modulating wide angle directed reflector of claim 36, wherein said code is a bar-code.

38. The light modulating wide angle directed reflector of claim 27, wherein said light modulating layer is transformable from a first light modulating state to a second light modulating state and vice versa.

39. The light modulating wide angle directed reflector of claim 38, wherein said second light modulating state is neutral.

40. A light modulating wide angle directed reflector comprising:
(a) a lenticular layer including at least one array of lenslets;
(b) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence; and
(c) a light modulating layer being disposed relative to said lenticular layer and said reflective layer, said light modulating layer being for modulating light passing through and reflected from the light modulating wide angle directed reflector, said light modulating layer being transformable from a first light modulating state to a second light modulating state and vice versa.

41. The light modulating wide angle directed reflector of claim 40, wherein said angle of incidence on said lenticular layer ranges at least +/− 20 degrees from a normal angle of incidence.

42. An object identification system comprising:
(a) an identifier tag being mountable on an object to be identified, said identifier tag including:
(i) a lenticular layer including at least one array of lenslets, each of said lenslets having a focal length;
(ii) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence; and
(iii) a light modulating layer being disposed relative to said lenticular layer and said reflective layer, said light modulating layer being for modulating light passing through and reflected from the light modulating wide angle directed reflector; and
(b) an interrogator device including:
(i) a light source for directing light onto said identifier tag;
(ii) a light detector for receiving light reflected from said identifier tag, said light reflected being modulated by said light modulating layer; and
(iii) a processing unit communicating with said light detector for processing said light reflected so as to yield information corresponding to said light modulating layer, to thereby identify said object.

43. The object identification system of claim 42, wherein said angle of incidence on said lenticular layer ranges at least +/− 20 degrees from a normal angle of incidence.

44. The object identification system of claim 42, wherein said light modulating layer and said reflective layer are integrated into a single reflective and light modulating layer.

45. The object identification system of claim 42, wherein said light modulating layer is selected from the group consisting of a light polarizing layer, polarization modifying layer, an optical filter, and a patterned layer having substantially opaque regions and substantially transparent regions.

46. The object identification system of claim 42, wherein said light modulating layer is disposed between said lenticular layer and said reflective layer.

47. The object identification system of claim 42, wherein said light modulating layer is disposed in front of said lenticular layer.

48. The object identification system of claim 42, wherein said light modulating layer includes a fluid.

49. The object identification system of claim 45, wherein said patterned layer is a code identifying the object.

50. The object identification system of claim 49, wherein said code is a bar-code.

51. The object identification system of claim 42, wherein said light modulating layer is transformable from a first light modulating state to a second light modulating state and vice versa.

52. The object identification system of claim 42, wherein said second light modulating state is neutral.

53. A movement monitoring system for monitoring a movement of an object, the movement monitoring system comprising:
(a) at least one wide angle directed reflector being mountable on the object, said at least one wide angle directed reflector including:
(i) a lenticular layer including at least one array of lenslets, each of said lenslets having a focal length; and
(ii) a reflective layer being disposed relative to said lenticular layer, said lenticular layer and said reflective layer being constructed and designed such that light incident at an angle of incidence on said lenticular layer is reflected by said reflective layer and redirected through said lenticular layer at a substantially constant angle relative to said angle of incidence; and
(b) an optical sensing device, including:
(i) a light source for illuminating said at least one wide angle directed reflector; and
(ii) a detector for receiving light reflected from said at least one directed reflector and being for monitoring changes in a position of at least one diffraction lobe of said light, so as to monitor a movement of the object.

54. The movement monitoring system of claim 53, wherein said angle of incidence on said lenticular layer ranges at least +/− 20 degrees from a normal angle of incidence.

55. The movement monitoring system of claim 53, wherein said at least one-wide angle directed reflector further includes a light modulating layer being disposed relative to said lenticular layer and said reflective layer, said light modulating layer being for modulating light passing through and reflected from the light modulating wide angle directed reflector.

56. The movement monitoring system of claim 53, wherein said at least one wide angle directed reflector includes a plurality of wide angle directed reflectors spaced along the object.

57. The movement monitoring system of claim 53, wherein said at least one wide angle directed reflector is a retroreflector.

58. The movement monitoring system of claim 53, wherein said movement is a vibrational movement.

59. The movement monitoring system of claim 53, wherein the object is an aircraft wing.

* * * * *